Dec. 7, 1926. Re. 16,498

W. B. HARSEL ET AL

TIRE MAKING MACHINE

Original Filed Nov. 3, 1917 12 Sheets-Sheet 1

Inventors
Edward Nall, Deceased,
by Edith Alice Nall, Executrix,
and
William B. Harsel, By R. S. Trogner Attorney Dec. 7, 1926. Re. 16,498

W. B. HARSEL ET AL

TIRE MAKING MACHINE

Original Filed Nov. 3. 1917 12 Sheets-Sheet 2

Inventors
Edward Nall, Deceased.
by Edith Alice Nall, Executrix,
and
William B. Harsel,
By R. S. Trogner
Attorney Dec. 7, 1926. Re. 16,498

W. B. HARSEL ET AL

TIRE MAKING MACHINE

Original Filed Nov. 3, 1917 12 Sheets-Sheet 3

INVENTORS
Edward Nall, Deceased,
by Edith Alice Nall, Executrix
and,
William B. Harsel,
BY R. O. Trogner
ATTORNEY Dec. 7, 1926. Re. 16,498

W. B. HARSEL ET AL

TIRE MAKING MACHINE

Original Filed Nov. 3, 1917 12 Sheets-Sheet 4

Inventors
Edward Nall, Deceased
by Edith Alice Nall, Executrix.
and
William B. Harsel.

By R. P. Hooper Attorney

Dec. 7, 1926. Re. 16,498
W. B. HARSEL ET AL
TIRE MAKING MACHINE
Original Filed Nov. 3, 1917 12 Sheets-Sheet 5
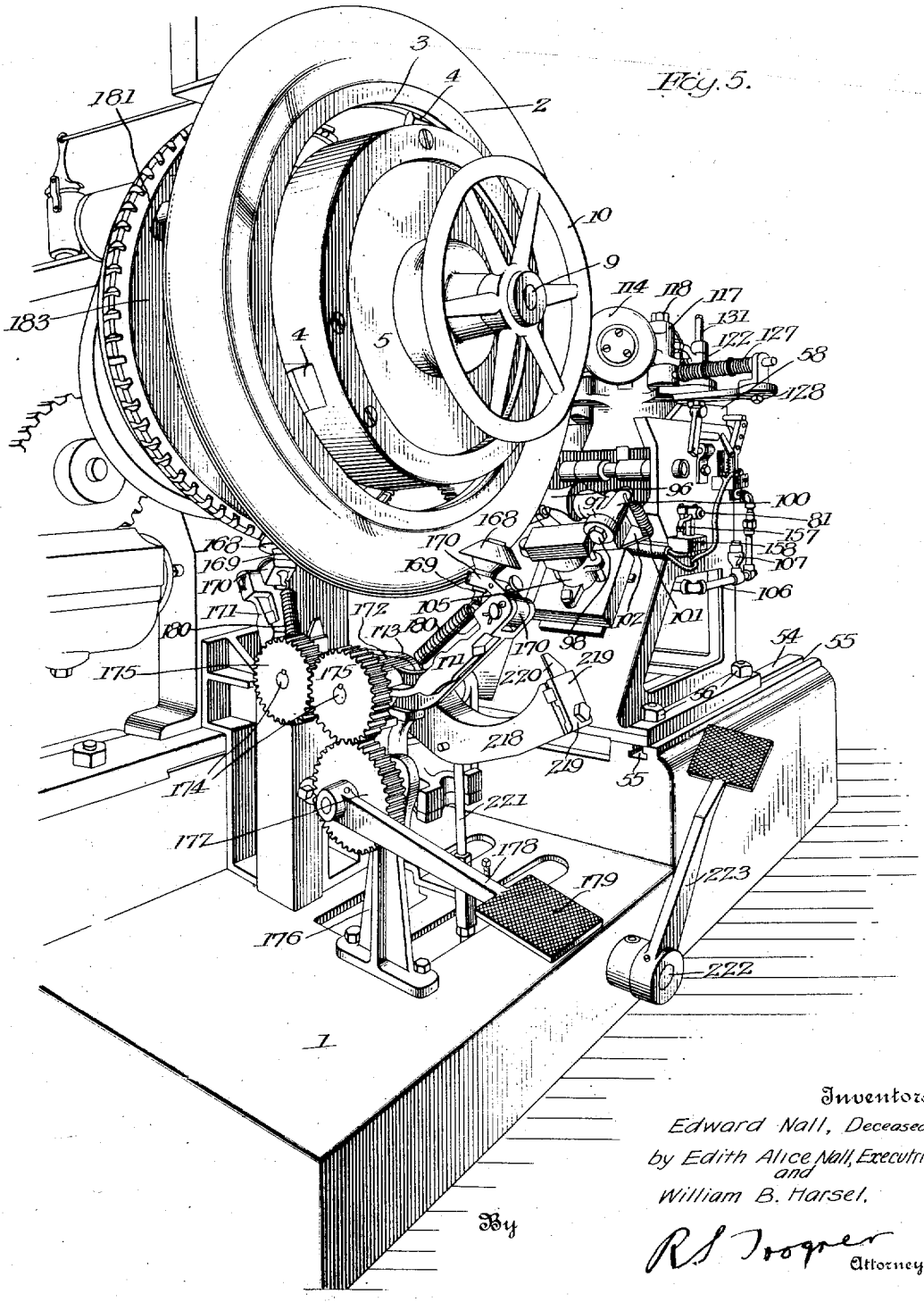
Inventors
Edward Nall, Deceased,
by Edith Alice Nall, Executrix,
and
William B. Harsel.
By R. S. Trogner
Attorney Dec. 7, 1926. Re. 16,498
W. B. HARSEL ET AL
TIRE MAKING MACHINE
Original Filed Nov. 3, 1917 12 Sheets-Sheet 6
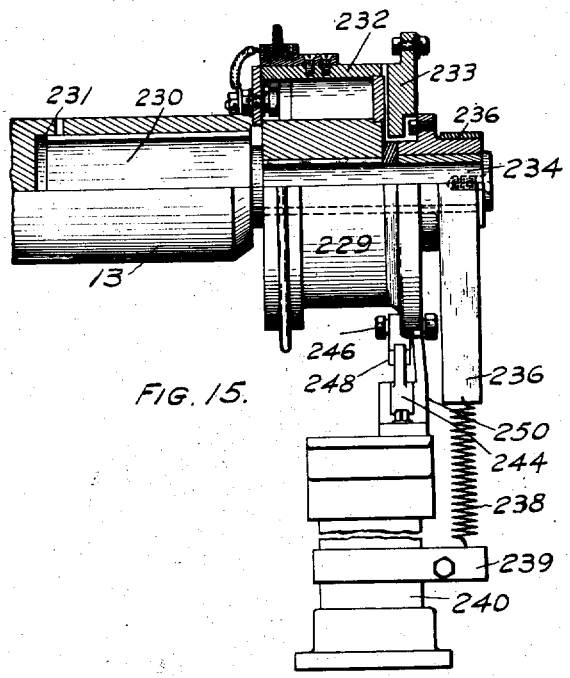
FIG. 15.
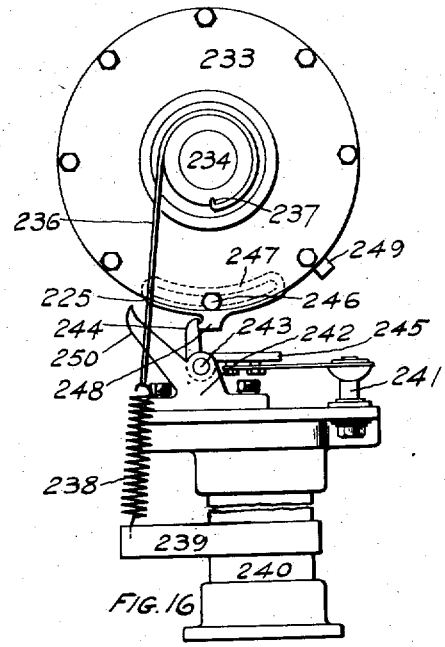
FIG. 16
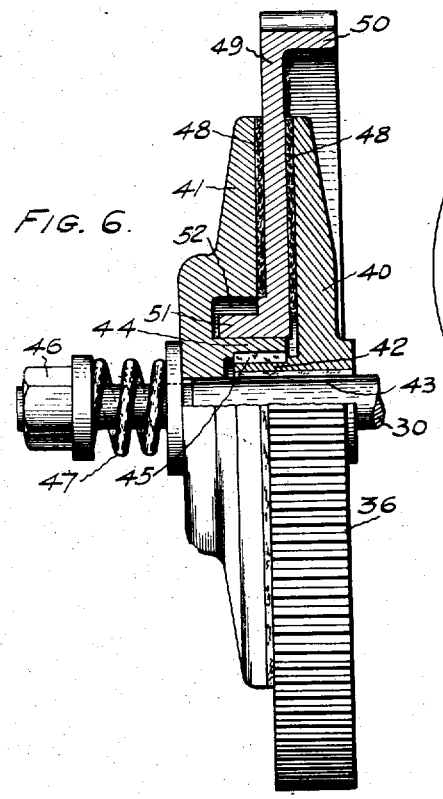
FIG. 6.
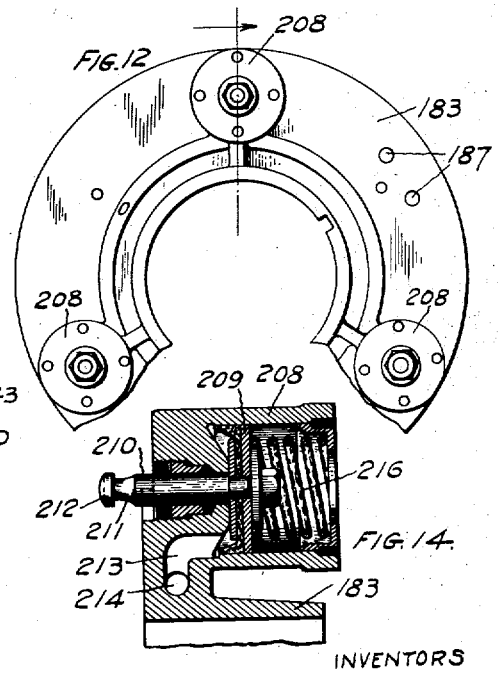
FIG. 12
FIG. 14.
INVENTORS
Edward Nall, Deceased,
by Edith Alice Nall, Executrix
and
William B. Harsel.
BY R. P. Dunn
ATTORNEY Dec. 7, 1926. Re. 16,498

W. B. HARSEL ET AL

TIRE MAKING MACHINE

Original Filed Nov. 3, 1917 12 Sheets-Sheet 7

INVENTORS
Edward Nall, Deceased,
by Edith Alice Nall, Executrix.
and
William B. Harsel.
BY R. P. Drogin
ATTORNEY Dec. 7, 1926. Re. 16,498

W. B. HARSEL ET AL

TIRE MAKING MACHINE

Original Filed Nov. 3, 1917 12 Sheets-Sheet 8

INVENTORS
Edward Nall, Deceased,
by Edith Alice Nall, Executrix,
and
William B. Harsel.
R. D. Sprague
ATTORNEY Dec. 7, 1926. Re. 16,498
W. B. HARSEL ET AL
TIRE MAKING MACHINE
Original Filed Nov. 3, 1917 12 Sheets-Sheet 9
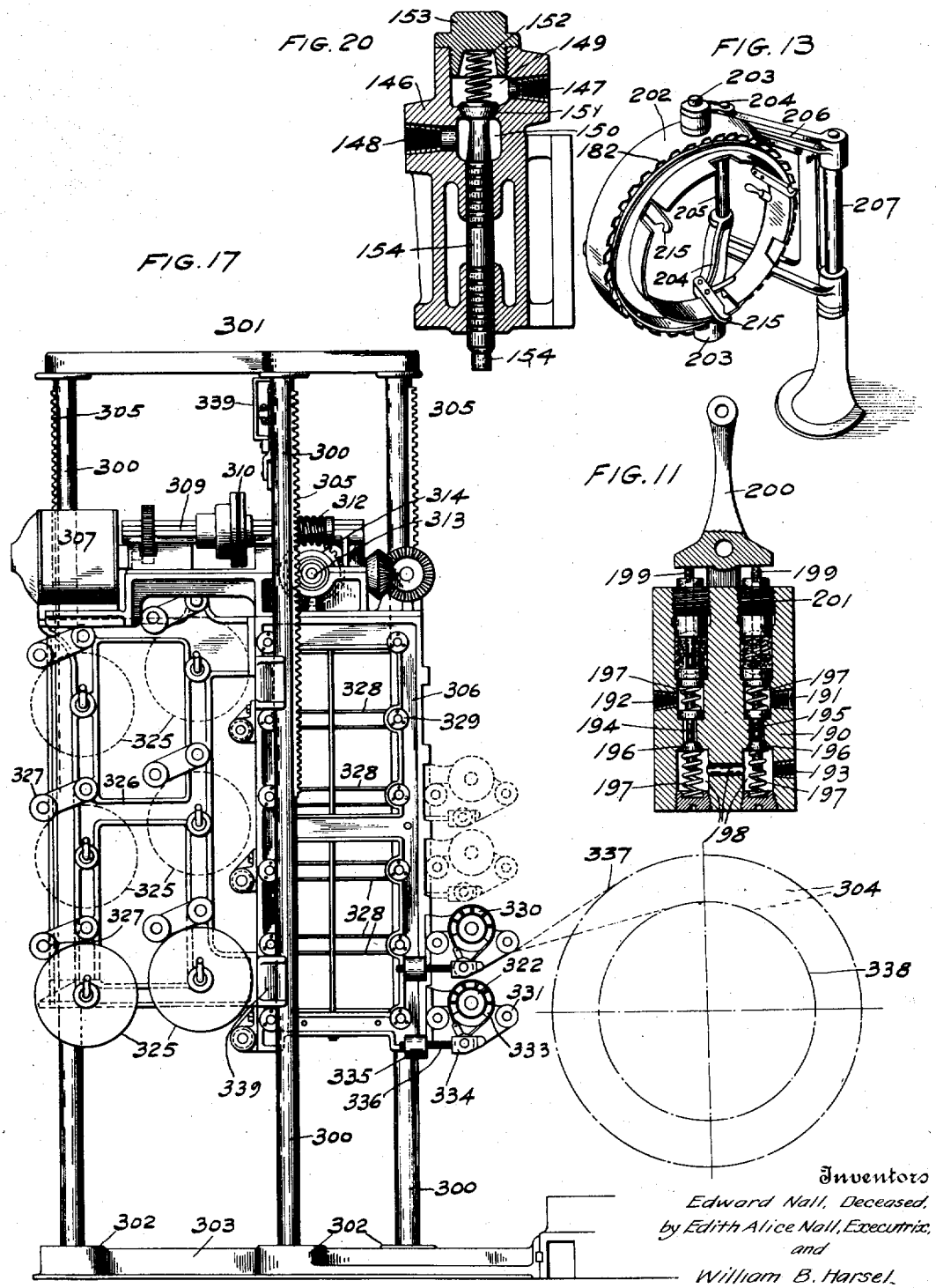
Inventors
Edward Nall, Deceased,
by Edith Alice Nall, Executrix,
and
William B. Harsel.
By R. S. Trogner
Attorney Dec. 7, 1926. Re. 16,498
W. B. HARSEL ET AL
TIRE MAKING MACHINE
Original Filed Nov. 3, 1917 12 Sheets-Sheet 10
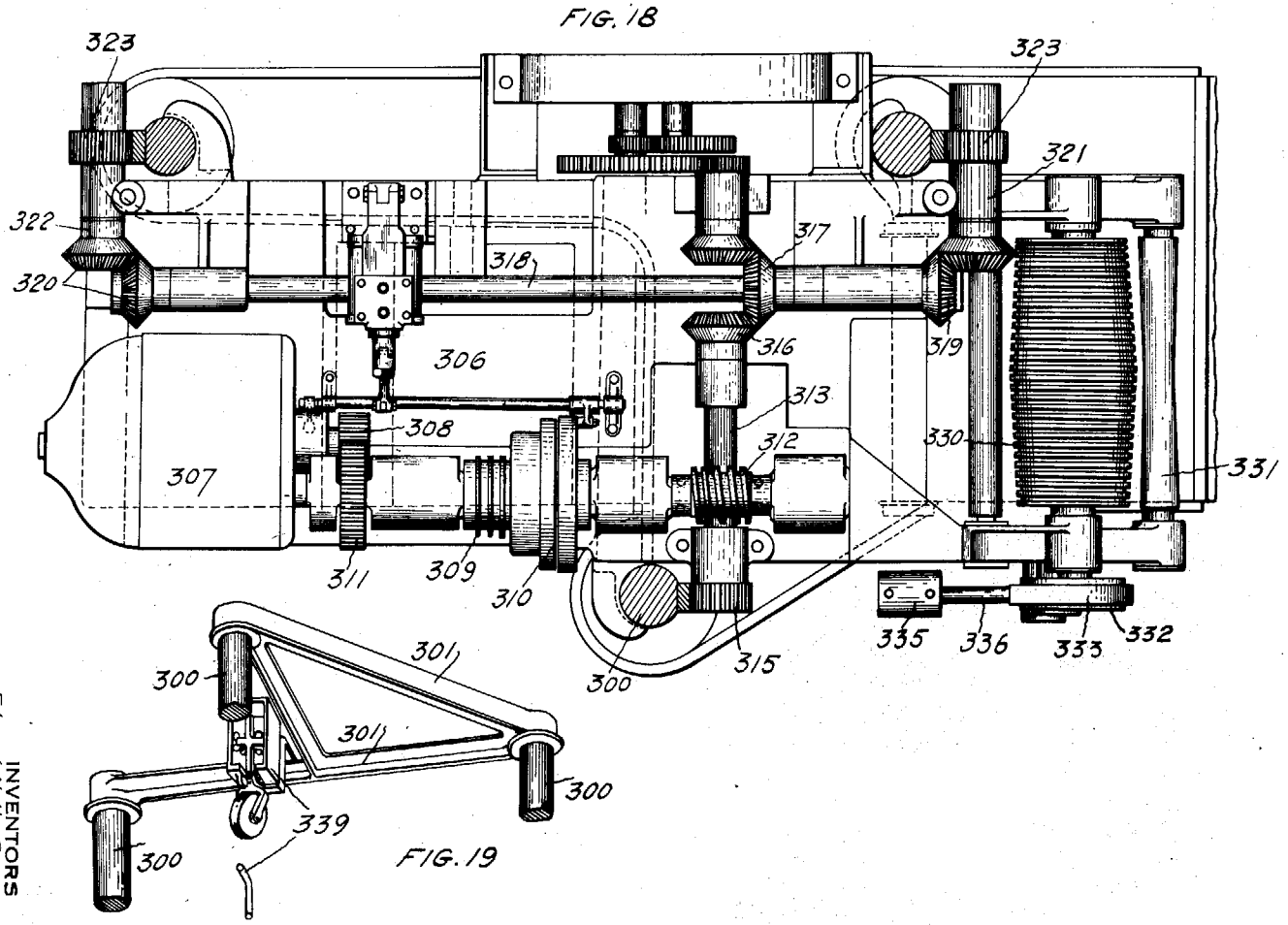
INVENTORS
Edward Nall, Deceased,
by Edith Alice Nall, Executrix,
and
William B. Harsel.
BY R. O. Dwyer
ATTORNEY Dec. 7, 1926. Re. 16,498

W. B. HARSEL ET AL

TIRE MAKING MACHINE

Original Filed Nov. 3, 1917 12 Sheets-Sheet 11

INVENTORS
Edward Nall, Deceased,
by Edith Alice Nall, Executrix,
and
BY William B. Harsel.

R. D. Dragoo
ATTORNEY

Dec. 7, 1926. Re. 16,498

W. B. HARSEL ET AL

TIRE MAKING MACHINE

Original Filed Nov. 3, 1917 12 Sheets-Sheet 12

INVENTORS
Edward Nall, Deceased,
by Edith Alice Nall, Executrix,
and
BY William B. Harsel.
R. O. Drogue
ATTORNEY Reissued Dec. 7, 1926.

Re. 16,498

UNITED STATES PATENT OFFICE.

WILLIAM B. HARSEL, OF AKRON, AND EDWARD NALL, DECEASED, LATE OF AKRON, OHIO; BY THE GOODYEAR TIRE & RUBBER COMPANY, ASSIGNEE.

TIRE-MAKING MACHINE.

Original No. 1,395,152, dated October 25, 1921, Serial No. 200,186, filed November 3, 1917, and part of original No. 1,395,055, dated October 25, 1921, original application filed November 3, 1917, Serial No. 200,185. Divided and application filed September 25, 1918, Serial No. 255,651. Application for reissue filed October 24, 1923. Serial No. 670,620.

This invention relates to machines for producing vehicle tires and has particular reference to machines for making the so-called "carcass" from which the outer casing, the tire, is formed. This "carcass" comprises a plurality of layers or plies of tire-fabric, superposed one upon the other, and having the general form of the finished casing.

This type of machine includes, in general, a rotatable tire-form or core upon which the "carcass" is developed by so-called stitchers, fabric-pressing rollers, or other instrumentalities which are adapted to roll and transversely stretch the first layer of fabric on the core, after which additional layers of the fabric are laid and stretched one upon the other; the desideratum being to position, stretch and shape the fabric upon the core without creases, wrinkles or air-pockets, so that a product of high grade and of exact uniformity may be produced.

One of the objects of the invention is to provide a machine which is of compact form and convenient arrangement, and wherein are provided power-operated means for actuating a large number of its mechanisms and parts so that manual operation thereof is reduced to a minimum with resultant increase of speed, decrease of labor, and greater uniformity of product.

Another object is, in such a machine, to provide certain novel mechanisms and instrumentalities for effecting automatic operation and control of the fabric-manipulating devices of the machine.

Another object is to provide means for maintaining the fabric-manipulating devices of the machine in accurate but yielding relation to the tire-form or core while these devices are traversing the surface of the fabric as it is laid and stretched over the core.

Another object is to provide automatic means which, at predetermined stages of the operation of certain mechanisms of the machine, arrest the operation thereof and permit other means automatically to restore the parts to normal position.

Another object within the contemplation of our invention is to provide, in conjunction with the tire-core and fabric-pressing mechanisms a stock-supplying structure whereby layers of fabric may successively be supplied therefrom to the tire-core in a rapid and convenient manner and with the exertion of a minimum amount of labor on the part of the operator.

Another object of the invention is to provide, in conjunction with the tire-form or core, means for effecting its rotation, first for a single revolution while the first layer or ply of fabric is being initially disposed thereon, and then, after being automatically stopped upon completing a single revolution, to be again set into motion for subsequent building-up of the "carcass" on the core.

Another object of the invention is to provide driving mechanism, common to the tire-core and to the fabric-pressing mechanism, and which is preferably under electric control of the operator at all times both for starting and arresting its operation.

Another object of the invention is to provide a pressure-fluid system for effecting operation of certain devices of the fabric-pressing mechanism, and control of which is electrically accomplished for convenient and rapid starting and stopping of such devices, both automatically and at the will of the operator.

Another object of the invention is to provide a convenient and easily manipulated trimming mechanism whereby the edges of the tire-fabric may be quickly and accurately trimmed preparatory to the finishing of the tire-structure.

Still another object of the invention is to provide a novel and conveniently handled mechanism for accurately positioning the beads or "bead cores", so-called, upon the fabric-covered core preparatory to overlaying the same with one or more layers of fabric.

The invention has also other objects and advantages which will be apparent from an inspection of the drawings hereto appended or will be made to appear in the following description.

In order that the invention may be more readily comprehended, we have appended drawings hereto as a part of this disclosure and in which we have illustrated, by way of example, an embodiment of the invention which has been demonstrated to be practical and highly efficient; but it is to be understood that our invention contemplates embodiments other than that shown and also utilizations other than that illustrated, and all employing the underlying principles of our invention.

In these drawings:

Fig. 5 is a view in perspective of a core-supporting means and of fabric-pressing mechanisms juxtaposed thereto;

Fig. 6 is a view in partial cross-section of shock-absorbing means provided on the main drive of the machine;

Fig. 11 is a detail view in section of a controlling-valve for a machine-positioned bead-ring-cylinder;

Fig. 12 is a fragmentary view in rear elevation of the machine-positioned bead-ring;

Fig. 13 is a view in perspective of a manually-positioned bead-ring and its supporting means;

Fig. 14 is a fragmentary detail view in section of a bead-ring clenching mechanism;

Fig. 15 is a fragmentary view, partly in cross-section, of an automatic device for governing single revolutions of the core-shaft, as at slow speed;

Fig. 16 is a view in rear elevation of the same;

Fig. 17 is a view in side elevation of a type of stock-rack which may be employed in conjunction with our tire-building machine;

Fig. 18 is a view in top plan, partly in section, of the stock-rack;

Fig. 19 is a fragmentary view in perspective of a portion of the stock-rack;

Fig. 20 is a view in vertical section of a cut-off valve; and

Figure 1:
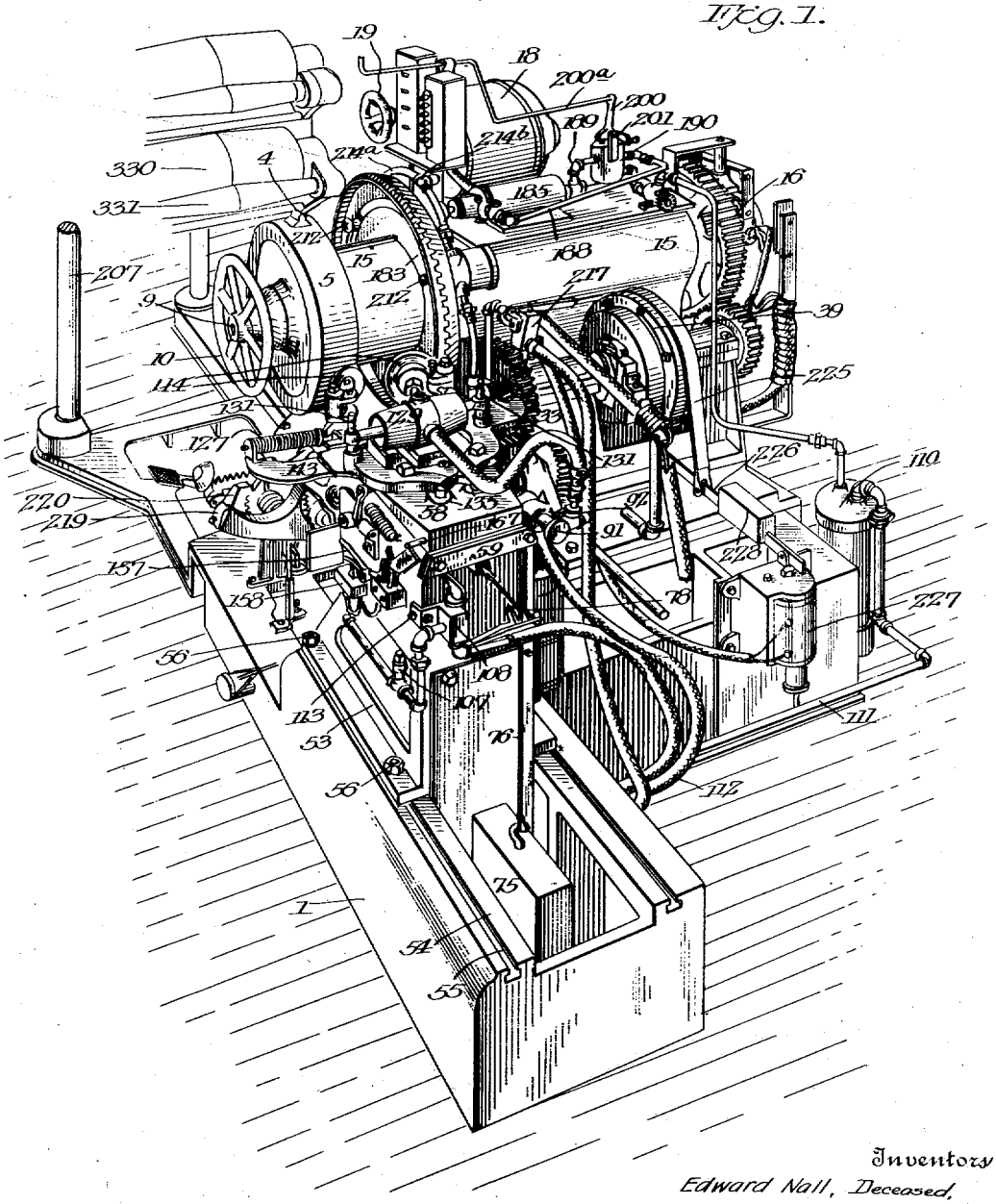
Fig. 1 is a view in perspective of one embodiment of the machine comprehended by the present invention.

The tire-building machine contemplated by our invention preferably includes three primary machine-elements, namely, a stock-rack for supplying fabric, a tire-form or core and its adjunctive structure, and fabric-manipulating mechanism adapted to operate on the core after fabric is positioned thereon from the stock-rack. Adjunctive to these elements are bead-setting mechanisms, trimming mechanisms, etc.

In the drawings, corresponding reference-characters are employed to indicate similar parts throughout the several views:

*1. General supporting structure.*—The various mechanisms and devices, hereinafter described, are preferably sustained by a general supporting structure which includes a machine frame or base 1 of any desired form and dimensions.

Figure 2:
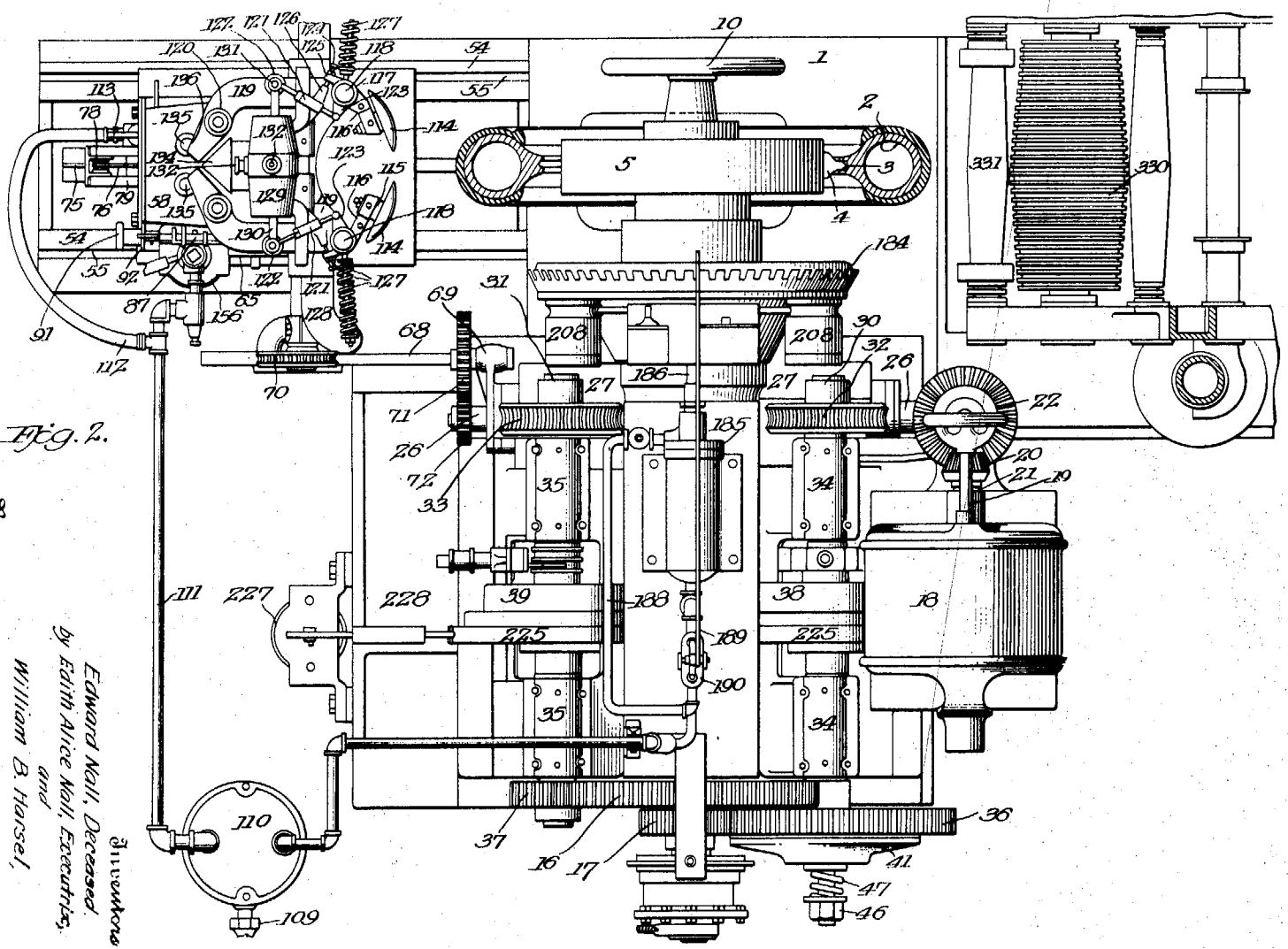
Fig. 2 is a view in top plan of the machine.
Figure 4:
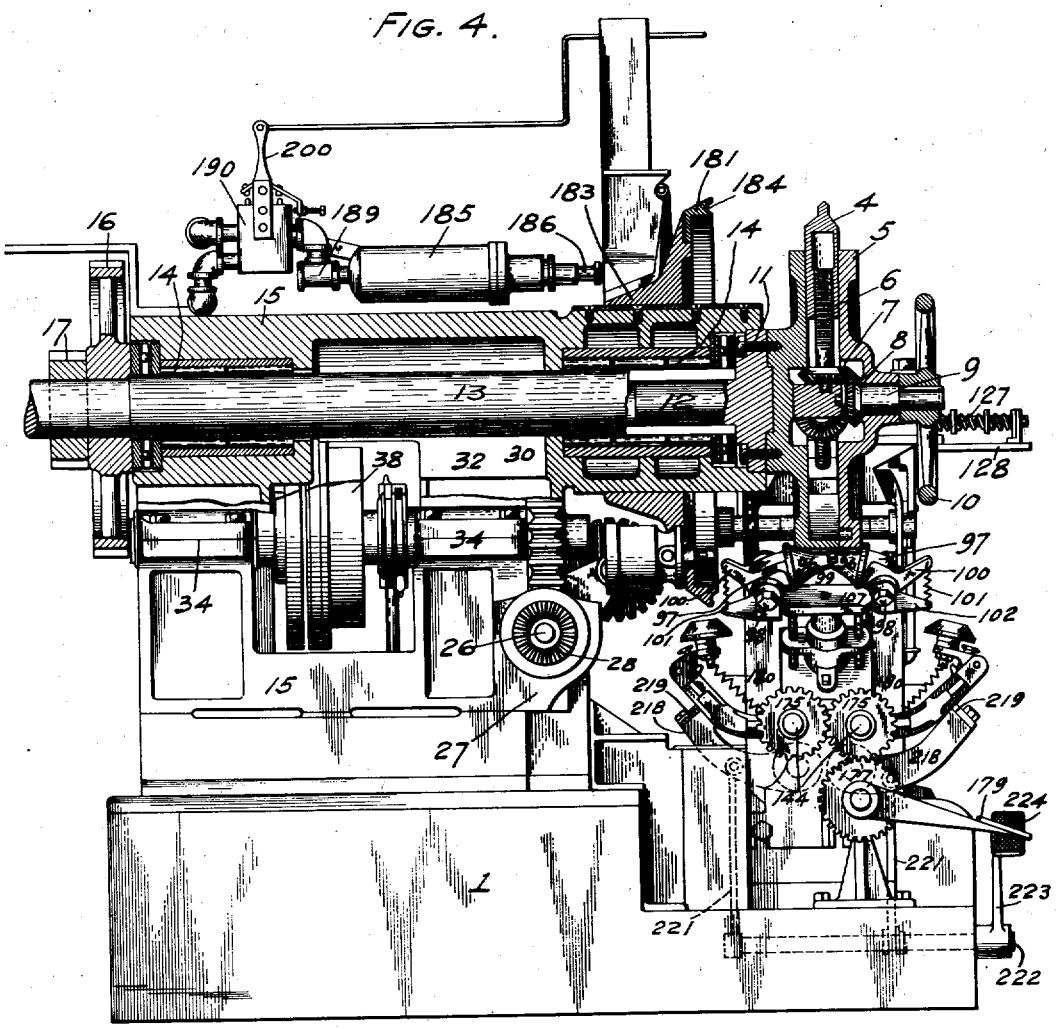
Fig. 4 is a view in longitudinal section, taken through the core-supporting means of the main machine element and looking toward the various fabric-pressing mechanisms.

*2. Core-supporting structure and core drive.*—Any appropriate type of structure may be employed to sustain a core or tire-form 2; but, in the present embodiment, we prefer to utilize that herein disclosed as being effectively and conveniently manipulated: This core (as best seen in Fig. 2) is provided with an annular groove 3 along its inner diameter whereby the core may be seated upon the extremities of a series of arms 4 which are extensible from a chuck-casing 5, in any preferred manner, such as that illustrated, for instance, in Fig. 4; the arms 4 are internally threaded to receive screw-shanks 6 which carry beveled pinions 7 adapted to mesh with a master drive-pinion 8 arranged within the hub interior of the chuck casing. This master pinion is mounted upon a shaft 9 carrying a hand-wheel 10 for manual control of the projection or retraction of the arms 4.

The chuck casing 5 is secured, as a whole, by any appropriate fastening means, such as bolts, 11 upon a cap extremity 12 carried by and rotatable with a shaft 13, the latter being journaled in groups of bearings 14 disposed in a suitable supporting structure, such as a core-supporting pedestal 15 erected upon the main bed plate or base 1.

A large gear 16 and a smaller gear 17 are fast on the rear end of the shaft 13 in order to provide a variable speed rotation for the shaft and tire-form supported thereon.

Any suitable type of prime mover may be relied upon to furnish the drive power for the entire machine, the present embodiment of the invention preferably making use of an electric motor 18. This motor may preferably, although not necessarily, be of what is known as the "variable speed" type, adjustment for speed being secured through the medium of the hand-shaft 19 which operates in the manner well known to the art. This motor carries a drive-pinion 20 upon its armature-shaft 21, such pinion meshing with a beveled gear 22 supported at one extremity of a counter-shaft 23 (Fig. 3), the latter being journaled in bearings 24 which support it upon a motor-bracket 25 at one side of the core-supporting structure. A main drive-shaft 26 extends transversely across the core-supporting pedestal 15, being journaled in suitable bearings 27 arranged thereon. This drive-shaft carries at its motor-end a beveled gear 28 which meshes with a similar gear 29 carried by the countershaft 23.

The main drive-shaft 26 is constantly rotated by operation of the motor 18, this main drive motion being transmitted to secondary shafts 30 and 31 (Figs. 2 and 3) through the medium of worm and worm-wheel connections designated in their entirety by the respective numerals 32 and 33. The secondary shafts 30 and 31 are respectively mounted in suitable bearing-members 34—34 and 35—35 arranged upon the core-supporting pedestal 15, and are respectively provided at their other extremities with terminal gears 36 and 37. The gear 36 is preferably of large diameter and is adapted to mesh with the small gear 17 on the core-shaft 13 and provides a fast-speed drive for the core-shaft. The gear 37 is of smaller diameter and is adapted to mesh with the large gear 16 of the core-shaft to provide a slow-speed drive for such shaft.

Each of the secondary shafts 30 and 31 is of a duplex construction and comprises a pair of alined shafts connected for rotation only by clutch-devices 38 and 39 for the respective shafts. These permit either of the shafts to be disconnected from the positive drive. A more detailed description of the operation of the main drive means will presently be hereinafter set forth.

In practice, we have found it advantageous to provide a shock-absorbing means for the drive-shaft 13 in order that the inertia resistance of this shaft may be gradually overcome and relieve undue strains upon the drive mechanism when the high-speed gears 36—17 are thrown into connection with this shaft. This shock-absorbing means is illustrated in Fig. 6, and includes a pair of frictional drive-plates 40 and 41 (one of which is movable relatively to the other), the former having a hub-portion 42 keyed upon the shaft 30 at 43 and at the point where the large gear 36 is mounted. The second or movable plate 41 is provided with a hub-portion 44 splined at 45 to the hub-portion 42 of the first grip-plate 40. The shaft 30 extends through the pair of plates 40 and 41 and carries an adjusting nut 46 between which and the plate 41 is interpositioned an expansible coil-spring 47 which serves resiliently to press the plate 41 toward the fixed plate 40.

Each of the grip-plates is provided with a frictional surfacing 48 in contact with opposite sides of a web 49 which connects an outer rim 50 of the gear 36 with a hub 51 thereof. This hub is mounted within an annular channel 52 formed within the interior of the plate 41 and about the hub-portion 44 thereof. The gear 36, being continually in mesh with the drive-gear 17 of the core-shaft 13, it will, owing to this shock-absorbing mounting of the gear, take up all motion of the high-speed drive-shaft 30 which cannot be immediately transferred to the core-shaft through the meshing gears. This is accomplished by a sliding of the friction plates 40 and 41 about the inner and outer surfaces of the gear-web 49. This pair of friction or grip-plates has such a high degree of frictional contact with the gear-web 49, however, that it is only the initial inertia of the core-shaft which is sufficient to prevent the gear 36 from being continuously unified with the high-speed drive-shaft 30. The different degrees of frictional contact may be effected by adjusting the nut 46.

*3. Fabric-manipulating mechanism.*—Juxtaposed to the tire-core and preferably sustained by the main frame 1, is a "carcass" forming structure which preferably comprises the following mechanisms and instrumentalities, and includes a presser-supporting and positioning carriage, its actuating mechanisms, etc., and between which and the core-supporting structure there is relative movement, with means for accomplishing such movement: These mechanisms include a pedestal 53 erected on a portion of the main machine bed 1 in such manner as to be radially adjustable in respect to the tire-form 2 and disposed centrally thereof in order that the pedestal may be successively arranged for tire-forms of differing diameters. To this end, trackway surfaces 54 (Fig. 1) are formed on the upper portion of the bed-plate 1 and grooves 55 are provided to accommodate headed nuts 56 which depend from the base of the pedestal 53. Where tires of the same size are continuously manufactured on the machine, no adjustment of the pedestal is required.

The top edges of the pedestal 53 constitute tracks 57 for a presser-supporting and positioning carriage 58 adapted to have an advancing and receding movement in relation to the tire-core. A stop-plate 59 on the pedestal limits the rearward travel of the carriage 58 away from the tire-core.

*4. Carriage and carriage-actuating mechanism.*—Movement of the carriage on its tracks and, thus, in relation to the axis of rotation of the tire-form—toward and away from it—may be accomplished in any appropriate way for purposes of positioning the parts and instrumentalities carried thereby in relation to the tire-form. In this instance, and by way of example, we have disclosed a carriage-actuating mechanism which includes the following instrumentalities:

Forward movement of the presser-carriage, toward the core 2, is accomplished through the medium of a carriage advancing gear 60 (Figs. 9 and 10) carried by a shaft 61 arranged transversely of the pedestal 53 and supported by bracket-bearings 62 for a partial swinging movement on an axis formed by a shaft 63. This shaft 63 is journaled in the sides of the pedestal 53 and intermediate of its ends carries duplex bearing-members 62.

Figure 8:
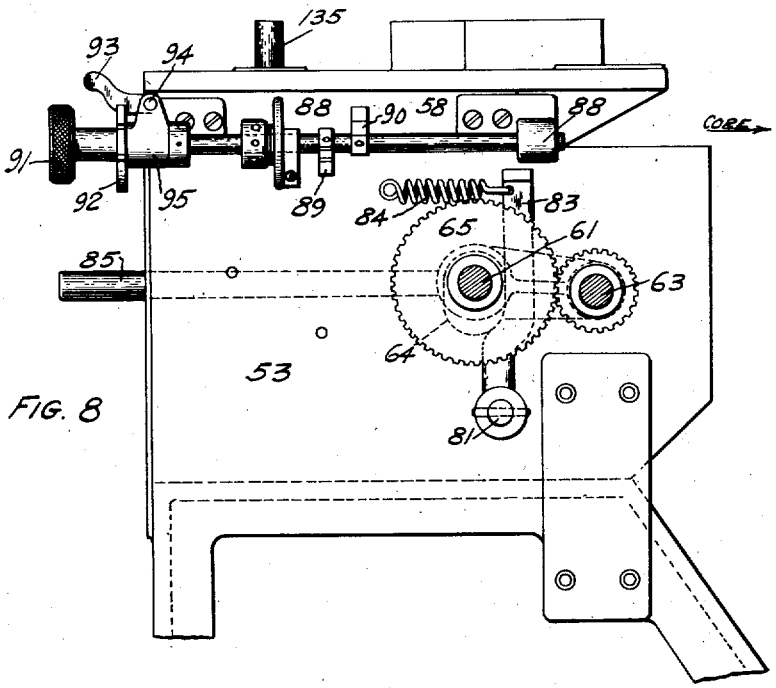
Fig. 8 is a similar view of the pedestal with some of the drive-mechanism of Fig. 7 omitted therefrom.

One extremity of the shaft 61 projects through an elongated aperture 64 (Fig. 8) in one wall of the pedestal and carries a drive-gear 65 which determines rotation of the shaft 61 and of the gear 60. The gear 60 is in operative engagement with a rack-bar 66 which depends from the presser-carriage 58.

Rotation of the gear 60 in a counter-clockwise direction (Fig. 9) will advance the carriage toward the tire-form. This rotation is secured through the medium of a worm 67 secured upon the extremity of a shaft 68, the latter being mounted at one end in a bracket 69 which projects forwardly from the pedestal 53. At the other end, the shaft 68 is mounted in a bracket 70 which projects laterally from the pedestal. The shaft 68 is thus arranged (Fig. 2) in parallelism to the main drive-shaft 26, and is provided with a gear 71 which is in operative engagement with a drive-pinion 72 carried by the extremity of the main drive-shaft. Engaging with the worm 67 is a worm-wheel 73, this latter being supported at the end of the cross-shaft 63 of the pedestal. This shaft carries (in addition to the drive worm-wheel) a pinion 74 meshing with the drive-gear 65 of the swinging shaft 61.

When the gear 60 of the swinging shaft 61 is in engagement with its rack bar 66, the continuously operating drive thereof—which is initiated through the main drive-shaft 26, thence through the pair of gears 72—71 to the stub shaft 68, thence through the worm and worm-wheel drive-connections 67—73, and thence through the engaging gears 74—65 serves to propel the presser-carriage 58 toward the tire-form 2 at a predetermined rate of speed.

*5. Carriage-returning mechanism.*—When the carriage has reached its limit of advancement toward the tire-form, means of an automatic nature are provided to throw the carriage-advancing gear 60 out of engagement with the rack bar 66 to permit a receding movement of the carriage from its advance-limit by a secondary power-operated means: This latter means includes the provision of weights 75 which are suspended by a flexible connection 76 (Figs. 1, 3 and 9) from a suitable anchor-bolt 77 provided at the extremity of the rack-bar 66. The flexible connection 76 is trained over a pulley 78 supported by a bracket 79 in rearward projection from the pedestal 53, in order that the vertical motion derived from the weight-motor 75 may be translated into the horizontal motion required for the retraction of the carriage to its rearmost limit, i. e., the stop plate 59.

The carriage-advancing gear 60 is maintained in engagement with the rack-bar 66 and against tendency of disengagement therewith (due to the weight of the gear 60, its mounting-shaft 61, and the bracket-bearing 62 supporting such shaft for swinging movement about the shaft 63) through the medium of a supporting arm 80. This is carried upon a rock-shaft 81 journaled in one wall of the pedestal 53, and normally engages, in the vertical position of Fig. 9, with a stepped plate 82 secured to the bottom of an adjacent portion of the bracket-bearing member 62. Also secured upon the shaft 81, but exterior of the pedestal 53, is a trip-arm 83, normally maintained in the vertical position illustrated in Figs. 7 and 8, and by a contractile spring 84.

*6. Carriage-arresting mechanism.*—As the carriage 58 moves forwardly, i. e., toward the tire-form, a manually-positionable trip-means (suspended laterally from the carriage and in the path of the upright trip-arm 83) will be capable of engaging such arm and of moving it from and maintaining it out of its normal vertical position. This movement of the arm 83 is communicated to the support-arm 80, carried upon the rock-shaft 81, and shifts the arm 80 out of engagement with the stop-plate 82. Unsupported by the arm 80, the drive-gear 60 will then swing downwardly, due to the weight of the parts, until checked by the lower edge of the slot 64 formed in the wall of the pedestal 53 through which the shaft 61 projects. While this swinging movement of the shaft 61 disturbs none of the operative drive connections which continually rotate it, the rack-bar 66 will be released from its engagement with the gear 60 and, thus, forward or advancing movement of the carriage will accordingly be arrested automatically. This leaves the carriage subject to the retractive movement initiated by the weights 75 (these weights having been lifted vertically as the carriage 58 has advanced horizontally toward the tire-form) to return it to starting position.

In order to restore the meshing relation between the drive-gear 60 and the carriage rack-bar 66, the operator lifts the swinging shaft 61—by means to be described—until the supporting arm 80 is returned to its normal position by the spring 84. The shaft-lifting means, referred to, comprises a handle-bar 85 mounted in a socket 86 formed upon one of the bracket-bearing members 62, and as illustrated in Figs. 7, 8, 9 and 10.

The advancing movement of the pressure-carriage must be varied in distance in accordance with the nature of the work to be performed, and this is accomplished by the manually-positionable trip-means. In the present instance, these means include a shaft 87 (Figs. 7 and 8) journaled in suitable brackets 88 secured on the side of the carriage 58. Adjustably mounted upon the shaft 87 are oppositely-extending trip members 89 and 90, only one of which may be swung into the path of the trip-arm 83 at a time. The extremity of the shaft 87 is provided with a knurled hand-nut 91 and with an adjustable-disk 92. By grasping the nut 91, the operator is able to place either of the trip-members 89 or 90 into the correct position for actuating the trip-arm 83. The adjustment plate 92 is provided with a number of radial slots at its periphery, with which is adapted to engage a keeper-arm 93, such arm being pivoted at 94 upon a shaft-collar 95 in proximity to the adjustment-disk 92 and in which collar the shaft is rotatable.

7. *Fabric-pressing mechanism.*—It is now in order to describe the fabric-pressing mechanism, which, in the present instance, preferably includes three general structures, namely: first, tread-laying rolls supported upon the front portion of the pedestal 53 for the purpose of laying the center of any fabric-ply initially into contact with the surface of the core, or with that of a previously-applied layer of fabric; secondly, the fabric-positioning and pressing mechanism mounted and traveling with the carriage 58 and designed to effect the laying of the fabric-plies about the tire-core; and, thirdly, a group of fabric-laying rolls adapted for the sole purpose of laying down portions of the final plies of fabric.

The tread-rolling mechanism for any ply of fabric is utilized in order that a ply of fabric may be secured in place upon the tire-core preliminary to the action of the fabric-positioning and pressing devices, which might distort a ply of fabric were its center not first secured in place. The tread-rolling mechanism includes a pair of rolls 96 (Fig. 4) which are preferably concave in general outline and taper from their bases to their smaller outer extremities. A supporting sleeve 97 for each roll is movably mounted upon a bolt 98 and formed with a stem 99 which extends axially through the roll and presents the latter with its concave surface toward the tire-core. Each of the sleeves 97 is provided with an outwardly-projecting arm 100, to which is secured a contractile coil spring 101 having its opposite extremity fastened to a plate 102 carried by a lateral projection on bracket member 103, upon which member the roll-mounting bolts 98 are supported. The rolls 96 are positioned side by side with their outer extremities crossing at a slight angle, which is flattened out when the rolls are forced against the convexity of the core, and against the action of the contractile springs 101 which control the normal position of the roll-mounting sleeves 97. These tread-laying rolls are positionable by means which include a bracket 103 upon which both rolls 96 are commonly supported. This bracket is secured to the outer extremity of a piston 104 (Fig. 3) operable in a fluid-pressure-cylinder 105. Compressed air, or like pressure-fluid, is conducted to the cylinder through piping 106 which has interposed at a suitable point upon the line a leak exhaust-valve 107. This piping terminates within a control-valve housing 108. The compressed air (delivered from any suitable source, such as at 109, Fig. 2) is led to a filter 110 in which all impurities liable to effect a deterioration of the machine parts that are exposed to the air-flow are removed. From the filter 110 extends a line 111 which has a branch 112 (Fig. 2) connecting with the valve-housing 108. A vertically depressible valve-stem 108[a] (Fig. 3) is mounted within the housing 108 and is normally kept seated by resilient means (not shown) to prevent communication between the inlet air-branch 112 and the pipe-line 106 whereby the pressure-fluid is to be conducted to the cylinder 105. The stem 108[a] projects above the valve-housing and into the path of travel of an arm 113 attached to the rear portion of the carriage 58.

When the carriage is in its position of rest, that is, in its starting position, the arm 113 is out of engagement with the valve-stem; but the latter is so positioned that the initial advancing movement of the carriage results in a portion of the arm 113 engaging the depressible stem of the control valve 108 and of unseating the latter to admit air into the cylinder 105 through the conducting line 106. The valve is only momentarily unseated, but this is sufficient to admit the proper amount of air to actuate the piston 104; that is to say, the pressure-fluid enters the cylinder 105 and raises the piston 104, with the tread-laying rolls carried thereby, directly toward the tire-form and into contact with the ply of fabric which has been pulled thereon by the operator. The amount of air admitted into the pipe-line 106 is gradually exhausted through the valve 107, and the piston then returns to its original position by gravity. The springs 101 insure a resilient contact between the rolls and the fabric such that the latter is centrally applied upon the tire-core 2.

8. *Fabric-pressing device.*—Disposed on the carriage and traveling therewith to be positioned thereby in relation to the tire-form, is a set of fabric-manipulating devices which, in this instance, are primarily designed as fabric-pressing members or pressers. In this particular embodiment of the invention, these comprise a pair of fabric-rollers or conoidal disks 114, each of which is provided with an axial stem 115 for mounting in the apertured extremities of oppositely-disposed bell-crank arms 116. These arms are each provided with a terminal boss, or enlargement, 117, which is apertured in order to receive a pin 118 for pivotally mounting the arms 116 at the extremities of respective levers 119. These levers are, themselves, pivoted as at 120, adjacent their rearmost extremities, to the top of the carriage 58.

The pivotal movement provided for the arms 116 with respect to the levers upon which they are mounted renders these arms adjustable in order that their working angle may be predetermined and fixed as desired, at any time. Adjustment means for varying the angle of the arms 116 include turnbuckle links 121, one extremity of each turnbuckle being secured to a boss 122 formed upon the lever 119, and the opposite extremity being pivotally mounted on a lug 123 which projects inwardly from the oppositely-disposed arm 116 in order to provide a leverage whereby the arm may be moved about its pivot by proper manipulation of the turn-buckle link. Stop means are preferably provided to hold each arm 116 in the adjusted position determined by its link 121, and such means includes a thumb-screw 124 threaded through a second lug 125 projecting from the arm 116 and into engagement with a socket 126 formed upon the upper surface of the lever upon which the particular arm 116 is supported.

The fabric-rollers, carried by the levers 119, are adapted resiliently to engage the fabric-covered tire-core 2 and, to this end, spring means 127 (Fig. 2) of an expansible type are provided, these being supported upon bracket arms 128 projecting laterally from the presser-carriage 58 and engaged against the boss 117 upon which the respective arms 116 are pivoted to their corresponding levers. The function of the springs 127 is to effect a pressure on the swinging levers and, thus, cause the pressing-rollers thereon to be moved toward the core and maintained, with a yielding effect, on the surface of the core.

There are, as shown, a pair of the fabric-pressing rollers 114 and these are arranged in spaced relation. They are adapted to be positioned with respect to the tire-form, in a double manner; that is, in part by the carriage and in part by the instrumentalities just described. The carriage is, therefore, a presser-supporting and positioning structure, and the presser-rollers are independently actuatable thereon with respect to the rotating tire-core, first, to engage the sides of the successive layers of fabric stretched on the same and, then, to roll these layers down upon the form and upon each other.

In order that the fabric-rollers may be separated from all contact with the core, after they have completed their function of laying down any ply of the tire-carcass, and prior to the retraction of the carriage, there is provided a two-way fluid-operated cylinder 129 as a means for accomplishing this result, such means including the following structure.

In the pneumatic cylinder 129 is a pair of pistons (not shown) slidable in opposite directions, and each of which mounts a piston-rod 130, secured to bosses 122 of the corresponding levers 119 by upright pins 131. When air, or a similar pressure-fluid, is admitted into the two-way cylinder 129 through a central port 132 therein, the cylinder-pistons will be moved in divergent directions to produce a similar effect between the fabric-rollers 114 and simultaneously disengage the rollers from the core. The carriage 58 is then free to be retracted to starting position without danger of injury to the freshly applied tire-ply by the fabric-rollers. The pneumatic-cylinder is preferably supplied with pressure-fluid from the main air-supply filter 110 through automatic means which will presently be hereinafter set forth in detail. A leak-exhaust valve 132[a] may be placed in the top of the pneumatic-cylinder to exhaust air therefrom when the supply has been cut off.

The pneumatic-cylinder 129 is connected to the top of the presser-carriage 58 by a supporting member 133 which terminates in a triangular, or wedge-shaped, enlargement 134 (Fig. 2) designed to form a stop for limiting the movement of the levers 119 when the presser-rollers thereon are separated by operation of the cylinder 129. Stop means are also provided to limit the pivotal movement of each lever 119 in the other direction, these means including a pair of pins 135 which project upwardly through the top of the carriage and which have a stop-face 136 adapted to contact with the rear edge of the respective levers. The operation of the pins 135 will be understood from an inspection of Fig. 9, in which it will be seen that these pins are vertically slidable within a boss 137 formed inwardly of the hollow top provided for the carriage 58. The pins are positionable to limit pivotal movement of the levers 119 during a portion only of the forward travel of the levers 119, and are designed then to be removed, i. e., withdrawn from their projected position through the top of the carriage just following the contact of the presser-rollers with the fabric-covered core.

Figure 3:
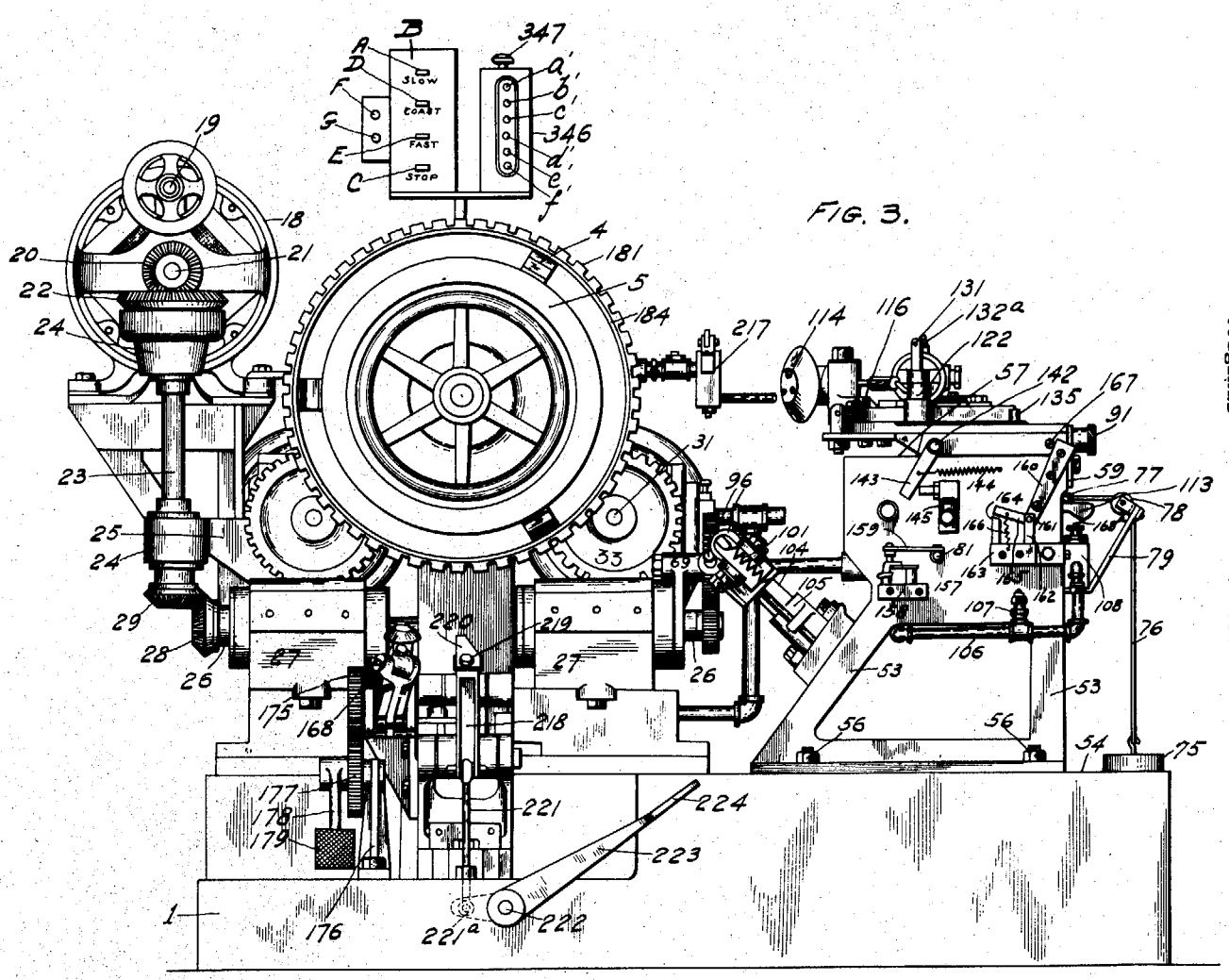
Fig. 3 is a view in front elevation of the machine of this invention, omitting the stock-delivery mechanism thereof.
Figure 9:
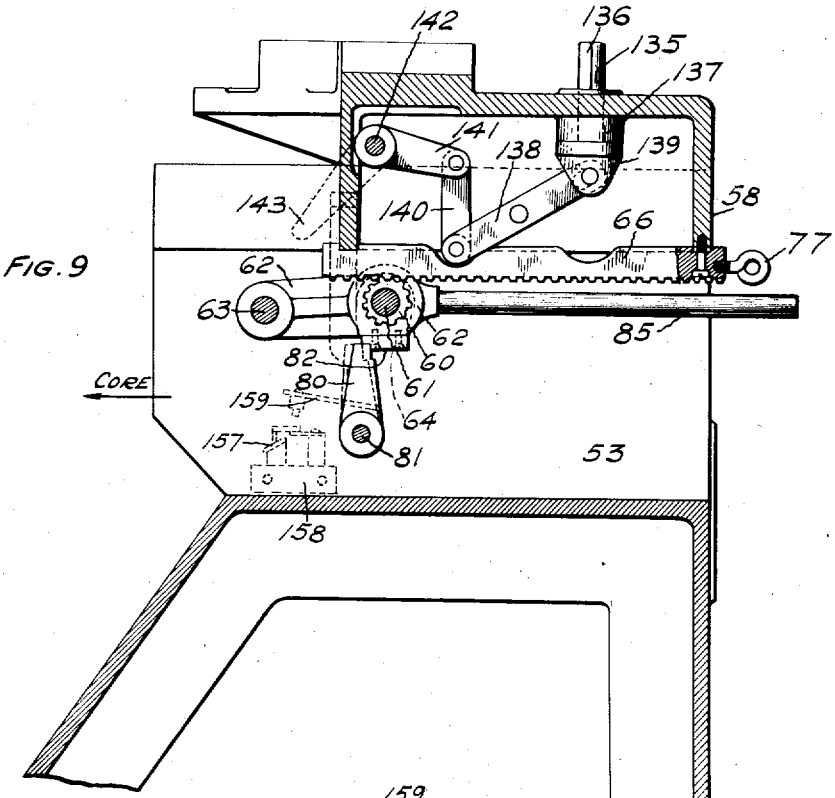
Fig. 9 is a view in vertical cross-section of the pedestal, looking rearwardly.
Figure 10:
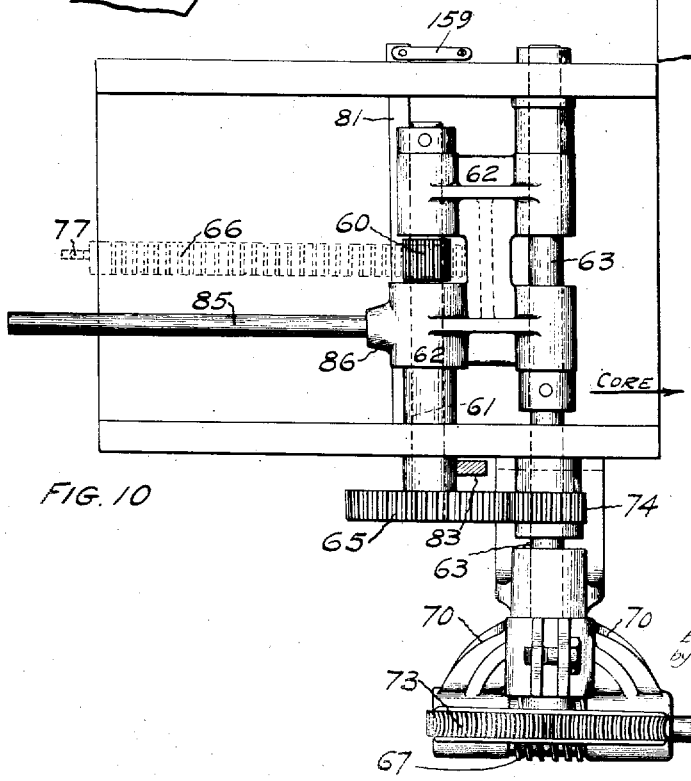
Fig. 10 is a view in horizontal cross-section of the pedestal.

The withdrawing means operable upon the pins 135 is, in this instance, automatic in its operation and includes centrally-pivoted levers 138 (one for each pin) housed within the carriage and connected at one end to corresponding caps 139 formed at the base of each pin and, at the opposite end, to a link 140 attached to an arm 141 carried upon the rock-shaft 142 (Fig. 9). The latter is journaled in the sides of the carriage itself, projects therefrom as shown in Fig. 3, and carries on its exposed extremity an operating arm 143. A contractile spring 144 is supported upon the exterior of the pedestal 53 and is connected with a rock-shaft operating arm 143 in order to exert a tendency to rotate this shaft in the counterclockwise direction of this figure. A stop member 145 (Fig. 3) is mounted on the pedestal in the path of the rock-shaft-arm 143 to engage the latter as it is carried backward and forward by the carriage during the advancing and receding movements of the same. The stop-member 145 is so positioned that, when the carriage 58 is in contact with its stop-plate 59, the rock-shaft 142 occupies such a position that the bolt pins 135 are projected through the carriage-top, the spring 144 exerting a yieldable pressure between the rock-shaft-arm 143 and the stop-member. As the advancing movement of the carriage is initiated, the rock-shaft-arm is freed from the stop 145; but the spring 144 is not of sufficient power to rotate the rock-shaft 142 in a counter-clockwise direction and, thus, to withdraw the pins from their projected position at that time, because these are then being held by the springs 127 and levers 119. These levers 119 have a frictional engagement with the pins 135 due to the action of the springs 127 upon the forward ends of the levers. This frictional engagement, existing between each lever and its pin, is sufficient to prevent any rotation of the rock-shaft as the carriage moves forward until the presser-rollers 114 are brought into contact with the fabric-covered core. The initial contacting of the rollers with the core so counteracts the action of the springs 127 that the frictional engagement between each lever and its limit-pin is eliminated and this permits the extended spring 144 to rotate the rock-shaft 142 and withdraw the pins.

After the separated presser-rollers have traversed the largest diametral portion of the core, they must again approach each other as the pressing operation continues toward the very edges of the fabric upon the neck of the core 2. Here, where the diametral dimension of the core is smaller, the pressers 114 must necessarily be spaced apart a shorter distance than is permitted when the pins 135 are in their projected position. To permit this, the pins are withdrawn below the plane of the levers 119 and, as the pressers 114 then approach each other, the rear extremities of the levers 119 swing over the openings which the pins 135 had previously occupied. The pressure-fluid is then admitted into the cylinder 129, as has already been explained, to separate the pressers from contact with the core, in order that they may be moved backwardly with the carriage without further engagement with the core. Sufficient pressure is maintained within the cylinder 129 to force the rear extremities of both of the levers 119 against the triangular stop 134, leaving them again clear of the space which the pins 135 occupy when projected.

As the carriage 58 returns to its starting position, the rock-shaft-arm 143 is again engaged by the stationary stop-member 145 and the rock-shaft is rotated again to project the pins above the surface of the carriage-top. Immediately thereafter, the air-supply for the cylinder 129 is cut off, and the pressure within the cylinder is exhausted through the leak-valve 132[a] to permit the springs 127 again to force the pressers 114 toward each other until the rear extremity of their levers again engage the projected stops 135, at which time the mechanism is ready for the next operation.

Figure 7:
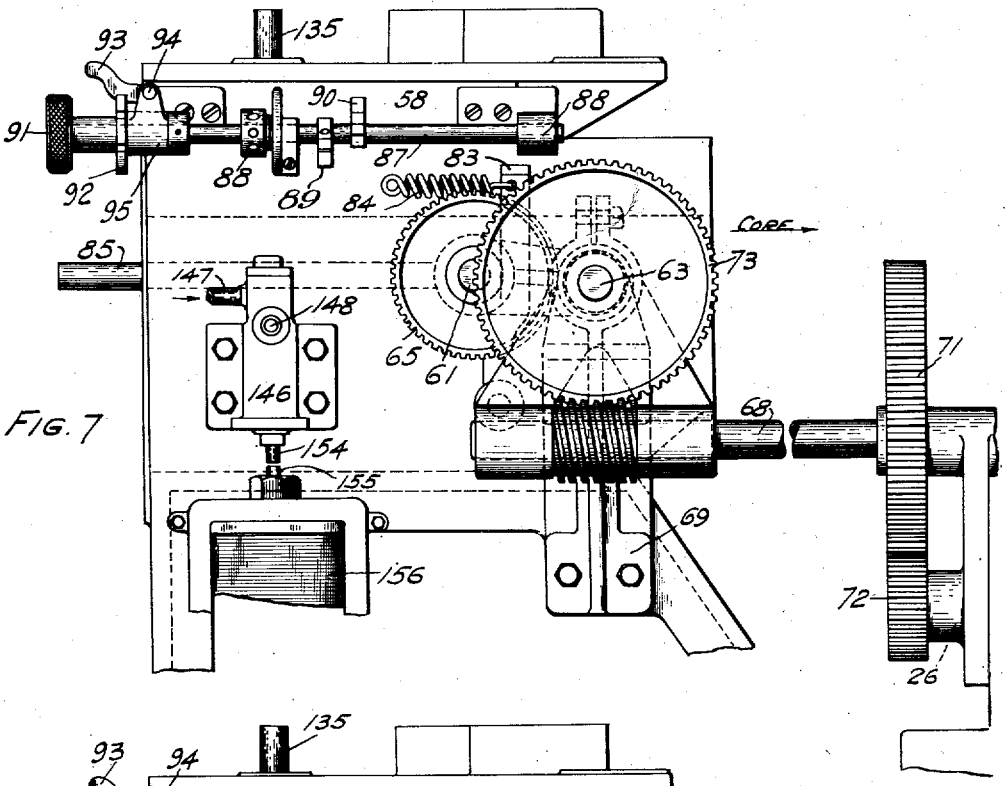
Fig. 7 is a fragmentary view in rear elevation of the carriage-supporting pedestal.

The means for cutting off the supply of pressure-fluid to the cylinder 129 is more particularly illustrated in Figs. 2, 7 and 20, and includes an electric solenoid-operated valve 146 mounted on the side of the pedestal 53 and provided with a non-registering inlet 147 and outlet 148. Communication between the inlet and the outlet is established through an inlet-chamber 149 and an outlet-chamber 150 and which are normally cut off by a valve-member 151 which is held seated between the chambers through the action of an expansible coil-spring 152. The latter acts upon the top of the valve-member 151 and is held in place by a removable cap 153 which gives access to the inlet-chamber 149. The valve-member 151 is provided with a stem 154 which extends through the lower portion of the valve 146 and projects therefrom into the path of a movable core-member 155 of the solenoid 156. The latter is mounted immediately below the valve 146 in such manner that energization of the solenoid forces its core-member 155 upward into contact with the stem 154 to unseat the valve 151 and permit communication between the inlet 147 and the outlet 148 of the valve-casing.

In order to render the operation of this valve automatic, it is only necessary that the electric-circuit controlling the solenoid be led through a pair of make-and-break devices arranged upon the pedestal 53. The first of these includes a contact-plate 157 (Figs. 3 and 9) supported upon the pedestal through the medium of an insulating plate 158. The rock-shaft 81, which carries the support-member 80 for the carriage-advancing-gear 61, projects through the wall of the pedestal and into proximity to this contact-plate 157 and carries a contact make-and-break arm 159. This arm is thus moved at the time that the gear-support-arm 80 is removed from below the shaft 61, that is, at the termination of the advancing movement of the presser-carriage. The movement of the arm 80, in the counter-clockwise direction of Fig. 9, also serves, at the same time, to force the contact-arm 159 against the plate 157, thus completing the electrical circuit through the solenoid 156 which, in turn, unseats the valve-member within the casing 146 and permits the pressure-fluid to flow through the valve-casing and into the cylinder 129. In this manner, the pressers 114 are automatically separated from the tire-core at the time that the carriage reaches its limit of advancing movement.

The pressure-fluid is maintained within the cylinder 129 until the carriage 58 has returned to starting position and is in contact with its limit-plate 59. The levers 119 must remain in engagement with the triangular stop 134 to permit the stop-pins 135 to resume their projected position above the top of the carriage. This they do only after the carriage has been fully retracted and after the pin-projecting arm 143 has engaged the stop-member 145. During all of this time, the contact remains made between the arm 159 and its coacting plate 157, since the rock-shaft 81 is prevented from returning to its normal position, under the action of the contractile spring 84 (Fig. 8), for the reason that the gear 60 carried by the swinging shaft 61 remains displaced from meshing engagement with the carriage-rack-bar 66, and will so remain until the operator manually reengages the gear with this rack.

It will thus be apparent that the pressure-fluid would ordinarily not be exhausted from the cylinder 129 by the time that the carriage 58 has again begun its advancing movement. This is at once initiated when the swinging shaft-gear 60 is meshed with the rack-bar 66 of the carriage, unless some means auxiliary to the make-and-break contact, just described, is employed to open the electrical circuit and automatically close the air-valve 151 by deenergization of the controlling solenoid thereof: The auxiliary means here shown includes a lever 160 (Fig. 3), pivoted at 161, to a supporting arm 162 carried upon a bracket-plate 163 which is secured to the side of the pedestal 53. This bracket-plate also supports a contact-arm 164 which is interposed in the path of movement of a lever-arm 165. A contractile spring 166 normally engages the lever-arm 165 with the contact arm 164 and closes the electrical circuit through the solenoid within which circuit the two arms are interposed and which would be interrupted were these lever and contact-arms separated. In order to separate the arms automatically when the carriage has returned to starting position, there is provided a pin 167 which projects outwardly and laterally from the presser-carriage a sufficient distance to engage with the lever 160, as shown in Fig. 3. When the presser-carriage travels forward toward the tire-core, the lever 160 is maintained by its spring 166 in the position which completes the electrical circuit through contact-arms 164 and 165. Upon return to starting position of the carriage and when it engages the stop-plate 59, the pin 167 engages and moves the lever 160 in the clockwise direction of Fig. 3 until the pair of contact arms are disengaged, thus breaking the circuit and deenergizing the solenoid regardless of the fact that the contact 157—159 has not yet been broken. This mechanism also prevents undue sparking which would result were the smaller surfaced contacts 157—159 employed to break the circuit. By this means, the supply of pressure-fluid to the cylinder 129 is cut off when the presser-carriage has completed one cycle of its movement, permitting any surplus fluid in the cylinder to be exhausted through the leak-valve 132[a] and permit the levers 119 to move back to their original positions, as determined by their respective stop-pins 135, the latter being now in their projected position above the top of the carriage.

In addition to the fabric-pressing members 114, we find it advantageous to provide an auxiliary fabric-pressing mechanism for operating on the outermost plies of the tire-carcass or casing—those overlying the beads, when the latter have been positioned upon the inner plies of the carcass. While it is possible that this function might also be performed by the pressers 114, by properly adapting the latter, the present embodiment of our invention includes separate ply-rolling members or bead disks 168, illustrated in Fig. 5. This auxiliary mechanism is disposed on the pedestal 53. These ply-rolling members 168 are shown as conoidal disks angularly mounted by stems 169 within supporting arms 170. These arms are pivotally arranged at the extremity of lever-members 171 which project upwardly from axles 172. These axles are journaled in bearing-members 173 supported immediately below the tire-form in any suitable manner. The axles 172 terminate in shaft-ends 174 upon which are keyed a pair of meshing gears 175. Supported by a bracket 176 in mesh with one of the gears 175 is a control-gear 177, upon the stub-shaft of which is disposed a lever-arm 178 terminating in a foot-pedal 179. It will be obvious that depression of the foot-pedal will cause an opposite rotation on the part of the meshing gears 175 in such manner as to swing the supporting-arms 170 of the disks 168 into contact with the carcass on the tire-core. When pressure is removed from the foot-pedal, contractile springs 180, secured to the axle-brackets 173, operate to return the lever-arms to their normal position of spaced relation with respect to the tire-core. The movement of the levers 171 is so measured with respect to the tire-core that the disks 168 supported on such levers will first contact with the carcass at the lateral apex of each bead. As pressure on the foot-lever is continued, each disk will move inwardly from the bead-apex to the very toe of the tire, serving to lap the loose edges of the outer plies of fabric which remain after the operation of the pressers 114 thereon, and to lap over the side and bottom of the endless beads the fabric which has been positioned upon the inner plies of the tire.

*9. Bead-setting mechanism.*—Among the adjuncts of the structure are devices for setting endless beads in proper position on opposite sides of the tire-carcass, and these may be actuated by pneumatic operating and controlling means: These devices include a pair of bead-setting rings 181 and 182 which are respectively machine-positioned and manually positioned. Each of these rings has a circumference equal to the interior diameter of one of the endless beads to be impressed into the partly-finished carcass.

The machine-positioned ring 181 (Fig. 4) is mounted upon a ring-bearing sleeve-member 183 keyed for sliding movement longitudinally upon the cylindrical frame-portion 15, where the latter houses the bearings 14 of the core-drive-shaft 13. This ring is mounted concentrically with the tire-core and is in such a position with respect thereto that the forward movement of the ring will, until the bead carried in its forward annular recess 184 impinges upon the surface of the partially-built carcass, be sufficient to position the bead at once in its proper place. Means for sliding the ring-bearing sleeve 183 toward and away from the tire-cord comprises a pneumatic cylinder 185 which is equipped with an extensible piston-rod 186, the latter being fastened to the sleeve 183 at 187, Fig. 12. Inlet ports are provided in each end of the cylinder and are respectively served by pipe-lines 188 and 189 which lead from opposite sides of a valve-casing 190. The latter is illustrated in Fig. 11 and, as there shown, includes a pair of outlets 191 and 192 (to which the pipe-lines 188 and 189 are respectively connected) and an inlet-port 193. Communication between the inlet 193 and either of the outlets 191 or 192 is established through respective passageways 194 and 195 formed interiorly of the valve-casing 190. Valves 196 are normally held seated, by expansible springs 197, to close each passageway from the common inlet-chamber 198. Each of the valve members 196, however, is provided with a stem 199 projecting upwardly through the top of the casing 190. A valve-lever 200 is exteriorly pivoted to the casing 190 through a supporting member 201 fastened upon the casing. This lever has a swinging movement to depress either of the valve-stems 199 in turn and to unseat the respective valves 196 carried thereon, thus opening communication between the inlet-chamber 198 and the corresponding pipe-outlet. As illustrated in Fig. 1 the pipe-lines 188 and 189 are so cross-connected to the valve-casing-outlets that movement of the lever 200 forward will admit pressure-fluid into the rear of the cylinder 185 and will accordingly move the bead-ring sleeve 183 forwardly; while movement of this lever 200 rearwardly will admit fluid into the forward part of the cylinder 185, and, thus, retract the bead-ring-sleeve 183 from its contacting position with the tire-core. The operator's work in handling this valve is, thus, simplified, as the sleeve 183 will be moved in the direction in which the handle-lever is pushed.

It will be observed that the bead-ring which has just been described will serve to position an endless bead upon one side only of the tire-carcass. The mechanism for placing a bead on the opposite side of the carcass includes the bead-ring 182 which is formed in all respects similar to the ring 181, with the exception that it is mounted upon a circular band 202 (Fig. 13) which is provided with diametrically opposed trunnions 203. A pair of yoke-arms 204 pivotally engage the band-trunnions 203, and, thus, commonly serve to mount the bead-ring 182 for pivotal movement upon an upright rod 205. This rod 205 is, in turn, pivotally supported by framework-arms 206 upon a standard 207, the latter being located at the front of the machine and at such a distance from the tire-core that the operator is given ample space for the movements required of him. From the turning point provided by the standard 207, the bead-ring 182 may be swung forwardly and into correct concentric engagement with the tire-core.

As it is necessary to impress the beads carried in the supporting recesses 184 of both of these bead-rings firmly against the inner tire-plies already laid upon the core in order that they may adhere thereto without possibility of displacement before or during the application of the outer plies of the carcass, means have been provided for linking the two bead-rings together under pneumatic pressure in such a manner that they may simultaneously be clenched upon the tire-core and from opposite sides thereof. This means (as disclosed in detail in Fig. 14) includes a plurality of pneumatic cylinders 208 which are supported upon the sliding sleeve 183 and in each of which is movable a piston 209. Each of these small pistons carries a rod or pin 210 projecting forwardly from the outer surface of the sleeve 183, the extremities of these pins being formed with a notch 211 and a head 212. All of the cylinders 208 (three in number) have a by-pass 213 communicating with a common air-chamber 214 arranged in the interior of the bearing-sleeve 183. Air, or other suitable pressure-fluid, is conducted to the chamber 214 and, thence, is led simultaneously to all of the cylinders 208 in such manner as to drive the pistons 209 rearwardly and to retract the headed pins 210 inwardly when the two bead-placing rings are simultaneously to be clenched upon the tire-carcass. The exterior bead-ring 182 is formed with a plurality of hooks or grip members 215 which project forwardly from the ring, each member being so positioned as to register with one of the headed pins 210. When these hook-members are properly engaged with the retractable cylinder-pins, and pressure-fluid is admitted into all of the cylinders simultaneously, the effect will be to clench the exterior bead-ring upon the outer surface of the tire-carcass and to impress the bead carried thereby firmly upon the inner tire-plies with the same force that the opposite bead is similarly impressed on the inner side of the carcass.

In Fig. 1, the annular air-duct 214 and the successive cylinders 208 are shown as commonly connected by a pipe-line 214[a]. Expansible springs 216 are provided in each of the cylinders 208 to return the headed piston-rods 210 to their normal projecting position when the fluid-pressure supply which controls the movement of the pistons 208 is cut off. A valve 217 which controls the admission of air into the central duct 214 of the bead-supporting sleeve permits of ready manual control by the operator. Pop-valves such as 214[b], may be placed at any point along the air-conducting system of the machine for ready discharge of air therefrom after the bead-clenching operation.

*10. Trimming mechanism.*—After the beads have been placed between a group of the inner plies of the tire-fabric and a group of the outer plies, and after the latter have been positioned and pressed down to lap the interposed beads, the final step in the carcass manufacture is to trim the surplus edge of the fabric along the inner edges of the beads. To accomplish this trimming uniformly and expeditiously, we have provided a separate mechanism: This mechanism includes a pair of arms 218 which have an arc of rotation similar to that of the levers 171. Each of these arms is fitted with an adjustable cap-plate 219 at its outer extremity, to support thereon a trimming-knife 220. Means are provided for swinging both of these arms simultaneously into contact with the tire-core, the length of the arms and their throw being such that the edge of the knife comes into contact with the carcass exactly at the inner bead-line in order to trim off the carcass-plies neatly along the bead. This means, in the present instance, includes a pair of vertically reciprocable rods 221 which are suitably linked to an arm 221[a] (Fig. 3) connected to a rock-shaft 222. The latter projects forwardly through the machine-base 1, and carries a foot-lever 223 terminating in the tread-plate 224. The parts are so arranged that a depression of the foot-lever will rock the shaft 222 and project the rods 221 upwardly, carrying with them the knife-arms 218 to which these rods are attached. This forces the knives simultaneously into engagement with the carcass and, during rotation of the latter, a single annular piece of trimmed scrap may be removed from each side of the carcass at once.

*11. Electrical controlling structure.*—Certain electrical controlling adjuncts are provided in order that the operator's work in running the machine and building tires thereon may be facilitated as far as possible.

As it is desirable to brake the core-shaft 13 at any instant, the secondary shafts 30 and 31 are each of a duplex construction, comprising a pair of half-shafts in axial alinement and connected only by a magnetic clutch 38—39. Each of these clutches is of the electrical solenoid type. One of the clutch-members is provided with a flexible brake-band 225 (Fig. 1) adapted to be tightened upon the clutch part by a downward movement of a lever 226 to which the ends of the band are connected. This lever is mounted to project laterally from the core-shaft upon which it is effective, and has its extremity supported upon the core of a solenoid 227 (Fig. 1). A weight 228 serves to depress this lever into such position that the brake-band 225 is tightened about its clutch part unless the solenoid 227 is energized in order that its core may be upwardly projected to lift the lever, in which case the brake-band loosely surrounds the clutch part and offers no resistance to the rotation thereof. It is to be understood that there is a braking attachment provided for each of the clutches 38 and 39 and that the solenoid 227 is so connected into the same electrical circuit which energizes each clutch that the pressing of a single button A (Fig. 3) in a control-box B by the operator will release the brake and energize the shaft-clutch to permit rotation of the shaft. The pressing of a stop-button C in the box B will break the circuit, deenergize the shaft-clutch to cut off the power transmitted by one shaft-portion to the other and, at the same time, deenergize the corresponding brake-solenoid 227 to permit the weight 228 to brake the shaft.

As the operation of pulling a single ply of fabric upon the tire-core requires but a single revolution of the core-shaft 13, an automatic control-device has been incorporated as one of the adjuncts of this machine, whereby the operator's work in this particular operation is materially simplified. This device, as illustrated in Figs. 15 and 16, includes a drum 229 mounted on a stem 230 within an axial boring 231 formed in the extremity of the core-shaft 13. This drum is formed of two parts, 232 and 233, which constitute the plates of a solenoid; the part 232 carrying the electrical connections and being energizable to attract thereto the other part 233 in order that rotation may be imparted to the latter as the core-shaft 13 revolves and rotates the part 233 with it. The clutch-part 233 is of disk form and is loosely mounted upon a stub-shaft 234 which forms a part of the stem mounting the whole drum 229. The disk 233 carries a hub-enlargement 235 over which is trained a band 236, one end of which is fastened to the clutch-part-hub at 237, while the opposite end is connected by a powerful contractile-spring 238 to some such stationary portion of the machine as the bracket 239. This bracket is secured to a pedestal 240 provided to support a stationary contact-arm 241 immediately below the clutch-disk 233. Upon this pedestal is secured a bracket 242 in which is journaled a stub-shaft 243 carrying an upwardly-projecting stop-finger 244 and also carrying a contact-arm 245 which is adapted to be disposed in the path of the other contact to make or break the electric circuit therethrough. Adjustably supported upon a bolt 246 extending through the edge of the clutch-disk 233 is a slotted plate 247 which is adjustably maintained upon the bolt and carries a lug 248 in radial projection from the disk. This latter is adapted to contact with the shaft-arm 244 as the clutch-disk 233 is rotated.

The contact arms 241 and 245, the solenoid drum 229, and the slow-speed solenoid-clutch 38, are placed in the same circuit so that, by pressing a button D in the box B, the operator may close this circuit and, thus, permit revolution of the shaft 13 while he is drawing a ply of the tire-fabric thereon. As rotation of the shaft 13 continues, the flexible band 236 is wound up on the hub 235 of the clutch-part 233 until a nearly complete revolution of the shaft 13 has been made, whereupon the radially-projecting lug 248 will contact with the shaft-arm 244 and rock the shaft 243 to break engagement between contact-arms 241—245, thus interrupting the circuit and automatically cutting off the power from the shaft 13. The latter will then have automatically been completely arrested, as previously explained, while the clutch-disk 233 is permitted to rotate back to its original position through the action of the contractile-spring 238 upon the band which has been wound upon the hub of this disk, the electrical attraction of the clutch-part 232 for this disk having been broken when the major drive circuit was open. As the disk 233 rotates backwardly, a stop 249 provided in radial projection from the disk engages an abutment 250, formed as a part of the shaft-bracket 242 and arrests the disk in its normal position. The lug 248 may be resiliently mounted if so desired in order to cushion the shock of the sudden return of this disk to its normal position. A fast-speed button E in the box B and with which the operator controls the rotation of the shaft 13 for the various fabric-manipulations and trimming operations, is arranged in a different circuit so that it does not actuate the solenoid drum 229 and, accordingly, does not put the mechanism just described into operation.

*12. Stock-rack structure: automatic fabric selector.*—It will be apparent that any type of practical fabric storing and delivery mechanism may conveniently be employed in connection with the mechanisms proposed herein for building tire-carcasses. The needs of the present machine are, however, best satisfied by the stock-rack structure to be now described.

This fabric-selector structure includes a triangular supporting framework composed of standards or upright members 300, the tops of which are connected by a frame 301, while the bottoms are seated in sockets 302 formed as a part of a base 303, for the structure. Fig. 17 shows the relation of the stock-rack to the tire-core 2 and in which the fabric is indicated by 304. The upper portion of each of the standards 300 supports a rack-bar 305 in order to mount a movable stock-storing and fabric delivery-frame 306 for vertical adjustment with respect to these standards.

The fabric storing and delivery-frame is arranged as an elevator and includes an elevating gear which will permit of the positioning of any of a plurality of stock-rolls carried thereby in correct relation to the core 2. An electric motor 307 (Figs. 17 and 18) is mounted on the top platform of the frame 306 and carries a gear 308 upon its armature-shaft for the driving of a counter-shaft 309. This latter is divided into a pair of shaft-portions in axial alinement and connected for the transmission of power from one shaft-portion to the other through the medium of a solenoid-clutch or magnetic clutch 310. One shaft-portion carries a gear 311 in mesh with the motor-gear 308 and determines the drive of the shaft when the clutch-parts are engaged. The other shaft-portion carries a worm 312, through the medium of which the drive of a cross-shaft 313 is accomplished, such shaft bearing a worm-wheel 314 in mesh with the worm-gear 312. One extremity of the cross shaft 313, carries the elevator-pinion 315 which engages with the rack-bar 305 of one of the standards 300. The opposite extremity of this shaft carries a beveled-gear 316 whereby, through the engagement with this gear of a second beveled gear 317, the drive of a longitudinal shaft 318 is accomplished. This shaft drives, by similar pairs of meshing beveled gears 319 and 320, stub-shafts 321 and 322. Each of these latter supports an elevator-pinion 323, these being engaged with the racks 305 of the remaining standards 300. It will thus be seen that a proper actuation and control of the mating parts, comprising the solenoid-clutch 310, will determine both the direction and extent of vertical movement which is imparted to the fabric-carrying frame 306, and which is necessary for a correct adjustment of this frame with respect to the tire-core. This clutch control is most advantageously attained by electrical apparatus presently hereafter to be described.

The supporting-frame 306, as herein designed, carries six rolls of fabric of different width, or composition, such as may be required for the widest possible range of the tire-building operations; but it is obvious that the number of fabric-rolls may be increased or decreased.

Fabric-storing rolls 325 are separately mounted in a rack-structure 326 forming a part of the elevator-frame 306. Each of these storing rolls is accompanied by its liner-roll 327 on which the material used to prevent adhesion on the part of overlying convolutions of the tacky tire-fabric may be wound up as the fabric itself is delivered to the core 2. Endless delivery belts 328 are mounted on rolls 329 journaled in pairs at the front of the frame 306. These belts are provided to pass the fabric from the storing-rolls 325 to the delivery-rolls 330.

With each of the delivery-rolls is a pair of rollers 331, the function of which is to insure a contact between the delivered fabric and approximately one-half of the delivery-roll 330. Each of the latter is formed in the tapered or double-cone fashion shown in Fig. 18 and is provided with a tension-mechanism which consists of a brake-wheel 332 over which is trained a brake-band 333. The extremities of the latter are fastened to a disk 334 journaled below the delivery-roll 330 and controlled by a weight 335 operable thereon at the end of a lever 336. The weight is adjustable upon its lever in order to vary the tension of the band 333 on the brake-wheel 332 as the fabric is delivered thereover to the core 2.

It has been demonstrated in practice that a stock-rack structure of the type here set forth is so universal in its nature that tires can be successfully built to dimensions having such variance as that disclosed between the dotted circles 337 and 338 of Fig. 17 without recourse to any additional apparatus.

Figure 21:
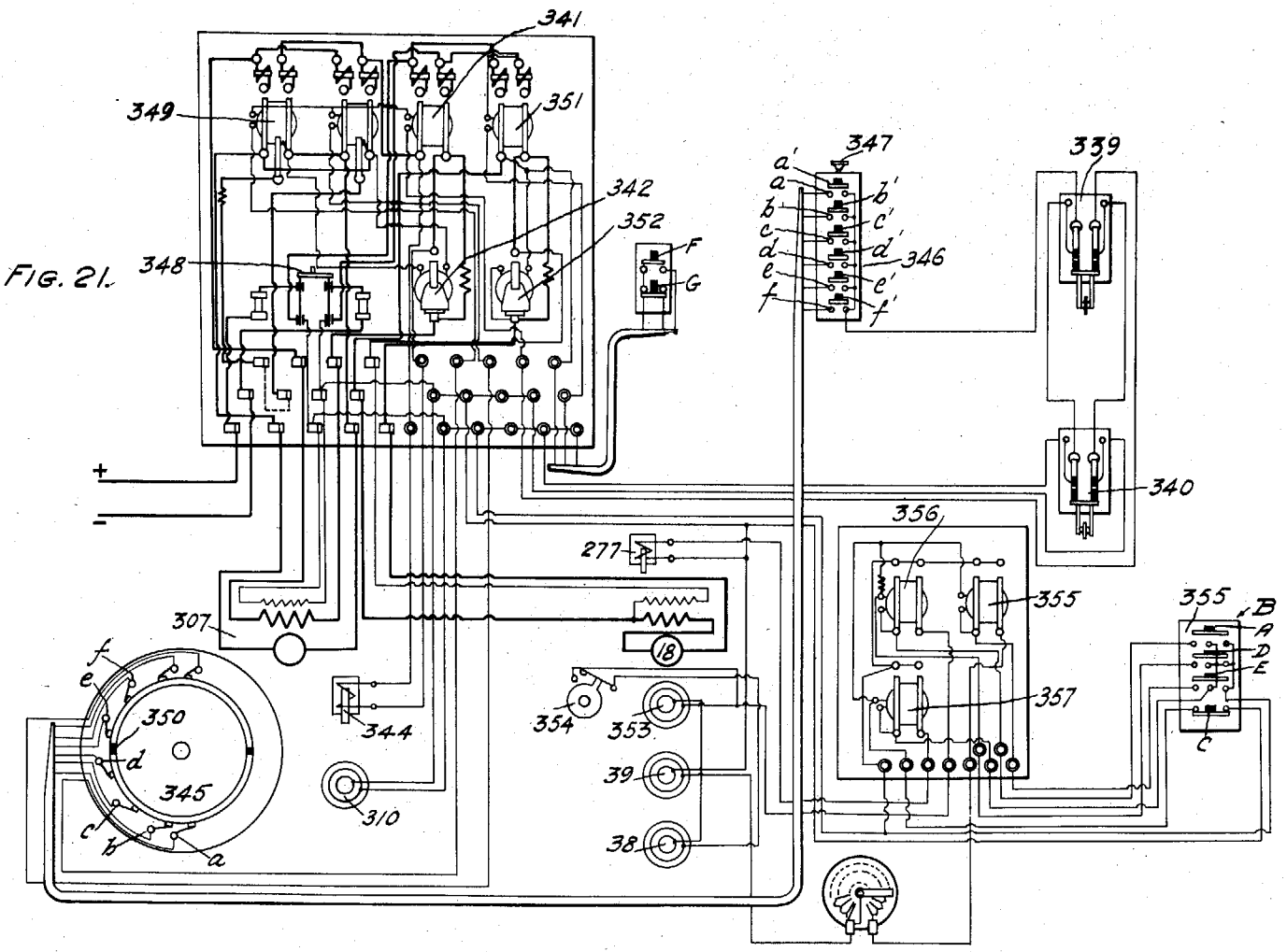
Figs. 21 and 22 are diagrammatic views of the wiring system installed in our machine.
Figure 22:
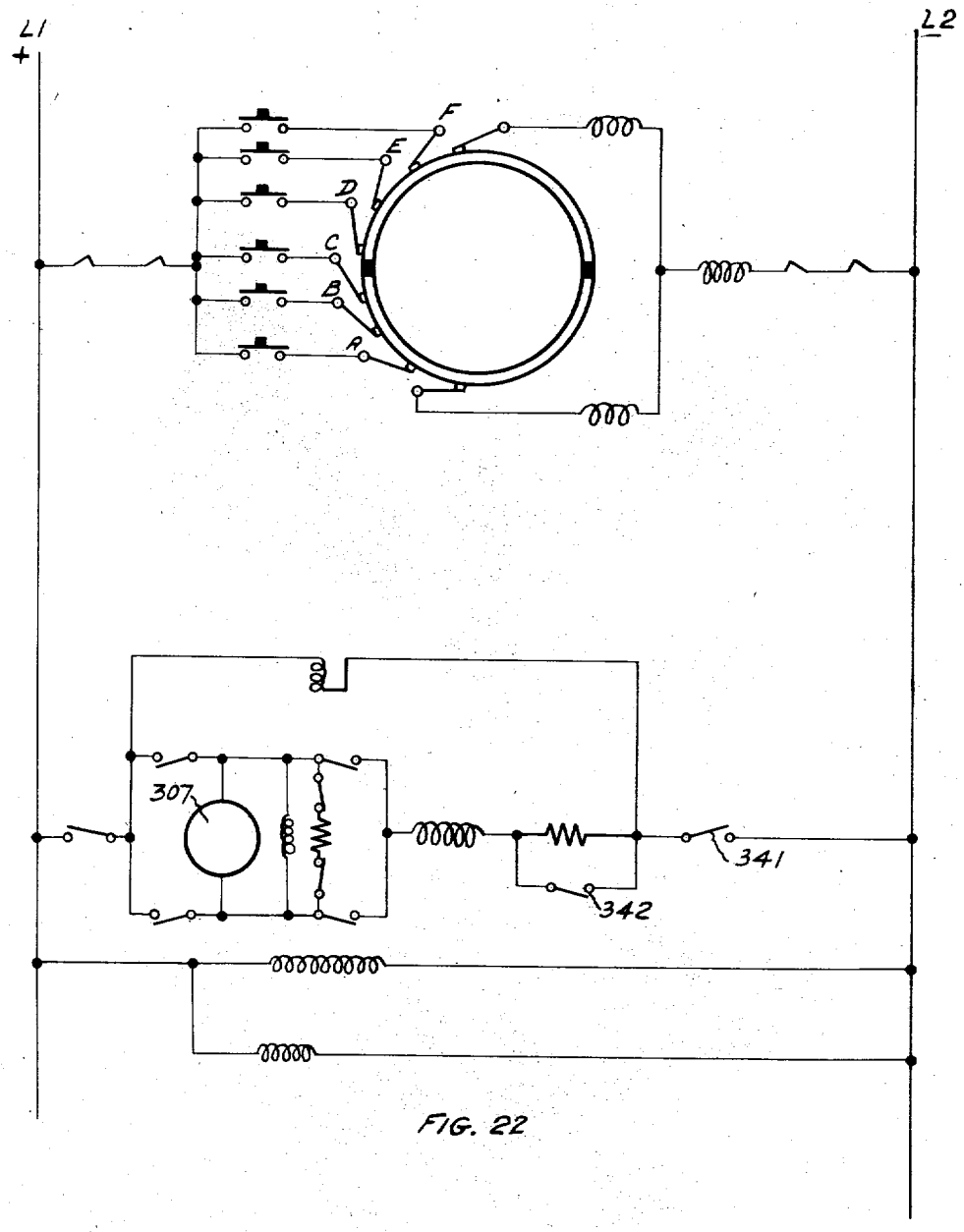

*13. Wiring system.*—As the electrical connections between the different controlling buttons hereinbefore referred to and the controlled parts may be of any appropriate character, and as they, specifically, are not involved in the present invention, a detailed description thereof is deemed unnecessary: In Figs. 21 and 22 we have diagrammatically illustrated the wiring system involved, Fig. 22 being a simplified, schematic diagram of a portion thereof: It is to be understood that, in the preferred arrangement, and as herein shown, the electrical equipment consists of the two motors 18 and 307, the latter being for the automatic fabric-selector (known as the elevating-gear) and the other for driving the tire-core and fabric-manipulating mechanism. The control is divided into two parts: The first governs the elevating-gear motor 307 and the other governs the driving mtor 18.

Fig. 21 shows the complete machine-control equipment as including a portion which governs the elevating-gear motor comprising a pair of magnetic reversing "up" and "down" switches 339 and 340, respectively, with contacts for providing dynamic braking to insure a quick stop when either of the switches is opened; and also shows a magnet main direction switch 341, an accelerating switch 342, the magnetic clutch 310, a magnetic or solenoid brake 344, a machine-limit or selective switch 345, and a control push-button station 346 containing push-buttons *a'*, *b'*, *c'*, *d'*, *e'* and *f'*.

The magnetic clutch 310 connects the elevating-gear motor 307 with the elevating-gear, already described. The magnetic brake 344 applies immediately upon interruption of power so as to provide a quick stop. The machine-limit switch 345 is geared to the elevating mechanism. It is provided for a six-roll rack with six adjustable contacts *a*, *b*, *c*, *d*, *e* and *f* to correspond with the six control buttons, above mentioned, and with six stopping positions of the elevating mechanism.

Operation of the elevating-gear is obtained as follows: Assume that the tire-core 2 is attached to its support 5 and is ready to receive its first layer of fabric. This first layer of fabric is on one of the rolls attached to the elevating-gear at a position corresponding to the contact *a* on the elevating-gear and where a carcass had just previously been finished, the gear will have been in a position for applying fabric corresponding to the contact *f*. To get the first roll in position the push-button *a'* is pressed. These buttons (*a'*, *b'*, *c'*, *d'*, *e'*, and *f'*) are mechanically constructed so that when one button is pressed it will remain in contact until another control-button or an emergency neutralizing button 347 in the control-station 346 is pressed. As soon as the terminal *a* is in contact, a circuit is established from line "+L1" through a knife-switch 348 and its fuses, through the "up" and "down" overtravel limit-switches 339 and 340, the push-button *a'*, the contact *a*, into the limit-switch 345, then through an "up" direction switch-coil 349, the main-switch coil 341, to line "—L2". The motor will start to move the gear up to "first-position", due to closing of the "up" switch, the main switch 341, and the accelerating switch 342. When these switches close, the magnetic brake 344 is released. After the position indicated by the contact *a* is reached, the machine limit-switch 345 interrupts the control-circuit due to an insulating block 350 coming under a finger of the contact *a*. This opens the motor-circuit and applies the dynamic brake and solenoid-operated brake to stop the gear at the correct position.

Other positions of the elevating-gear are obtained in a similar manner, namely, the push-button corresponding to the position desired is pressed and the automatic control functions to move the gear to the desired position.

The driving-motor control includes a magnet main switch 351 and an accelerating switch 352. There are also used the aforementioned solenoid-operated brake 227 for quickly stopping the tire-core, a timing clutch 353 with limit-switch contact 354, the aforementioned slow-speed clutch 38, the high-speed clutch 39, the relay control station or panel B containing slow, fast and brake relays 355, 356 and 357, respectively, (Fig. 21) and two push-buttons F and G, respectively, for controlling the "start" and "stop" of the driving motor, and the four buttons, marked A, D, E, C, respectively, for "slow", "coast", "fast" and "stop" control of the tire-core.

In the manufacture of the carcass, the next step after the elevating gear is in the correct position is to start the driving motor 18: This is accomplished by momentarily pressing the button A of the control station B. A circuit is thereby established from line "+L1", through the knife-switch 348 and its fuses to line "—L2". This causes the main direction switch 341 to close. The momentary contact of the push-button is "shorted" by the left-hand pole of the switch 351 as soon as the switch closes, thus maintaining the switch in the closed position. The opening of this switch is accomplished by momentarily depressing the normally-closed push-button G. This is used for stopping the driving motor 18. The closure of the switch 351 effects the starting of the driving-motor. When the C. E. M. F. is high enough, the switch 352 closes, cutting out the armature-accelerating resistance. After the motor has attained proper speed, a layer of fabric is automatically wound on to the tire-core while running the motor at slow speed. To obtain slow speed, the button marked "Slow" (A) in the panel B is momentarily pressed. This closes the slow relay 356 and the brake-relay 357, both of which remain active after the push-button is released. The slow relay 356 energizes the slow-clutch 38 and the timing clutch 353. The brake relay 357 releases the solenoid brake 227. The slow-clutch 38 connects the driving motor 18 to the tire-core drive through the slow-speed gears 16 and 17 and the timing clutch 353. The tire-core will then revolve through approximately 15/16ths of a revolution and stop, due to the opening of the timing switch 354, which disengages the slow-speed clutch 38. This disconnects the driving-motor 18 from the tire-core drive.

Next, the "Fast" button (marked E in the panel B) is pressed. This connects the motor 18 through the high-speed gear to the tire-core drive. The fabric is then treated by the fabric-manipulating mechanisms, as presently to be explained.

During these operations, it may be necessary to revolve the tire-core by hand in order to make an inspection, remove a small defect, etc. To do this, the operator presses the "Coast" button (marked D in the panel B). This drops out the slow-relay which, in turn, opens the circuit to the timing clutch. This clutch is spring-returned to the starting position and the brake relay 357 is energized, thus leaving the tire-core free to be moved by hand.

During any of these operations, the pressing of the "Stop" button (marked C in the panel B) drops out all relays, thus demagnetizing the clutches and applying the mechanical brake to the tire-core drive.

*Operation.*—The machine, in general, may be briefly described as operating in the following manner: Assuming that a fabric-roll has been selected and positioned in respect to the tire-core, as already explained, and the operator having drawn the free end of the ply of tacky fabric 304 from the roll, positions it upon the surface of the tire-core and pushes the controlling-button A magnetically to clutch the core-shaft to the constantly-rotating drive-shaft so that the core may make the aforementioned single revolution and then automatically stop, this automatic stopping thereof being effected by the engagement of the lug 248 on the clutch-disk 233 with the shaft-arm 244, as already set forth. The drawing of the fabric from its roll during the rotation of the core effects a longitudinal stretching of the medial portion of the ply, this resulting from the operation and form of the fabric-delivery roll 330 and the action thereon of the tension-devices already described. Having cut the ply then on the core to proper length, it is ready for action by the fabric-manipulating mechanism: As a first step to this, the operator pushes the controlling button E to clutch the core-shaft to the high-speed drive; and, then, to initiate action of the fabric-manipulating mechanism, the operator actuates the lever 85. The carriage 58 will have been at its starting position, as shown for instance in Figs. 2 and 3. The action of raising the lever 85 connects the carriage-driving mechanism to the constantly operating main drive of the machine so that the carriage will begin its advancing movement. As the carriage moves forward, the arm 113 engages the stem of the valve 108 to admit air into the cylinder 105, resulting in the raising of the tread-laying rolls 96 into engagement with the then rotating fabric-covered core to effect a pressing of these rolls on the thread-portion of the ply. During this action, the carriage continues to move forward and, in due course, the fabric-pressing rolls 114 are by the carriage positioned into engagement with the fabric on the core to effect their function of pressing and stretching the fabric transversely about the core. The progressive movement of the carriage causes these rolls 114 to traverse the sides of the core down to the "bead position" thereof. During such movement of the rolls, the springs 127 act to produce the required pressure of the rolls upon the fabric in order to insure the performance of their required function. As already described, these springs are permitted to perform their function, during the advancing movement of the carriage, by the withdrawal of the lever-controlling pins 135. When the rolls have accomplished their function and nearly reached the edge of the fabric on the core, the trip 89 will engage and operate the trip-arm 83 and, thus, effect a disengagement of the drive-gear 60 from its rack to arrest the advancing movement of the carriage.

The carriage, then being free from its driving mechanism, the carriage-returning motor (comprising the weight 75, etc.) becomes active to return the carriage to starting position. At this point, we may state that the disengagement of the drive-gear 60 from its rack may not only be accomplished automatically in the manner just described, but it may also be effected manually, at the will of the operator, by moving the trip-arm 83 in a clockwise direction, as viewed in Fig. 8. It will be understood, of course, that the carriage 58 and the tire core 2 receive motion from the same common source, namely, the electric motor 18; hence, during the advancing movement of the carriage, the core receives motion in synchronism therewith. As the carriage advances toward the core, it elevates the weight 75 so that, when the carriage is released (automaticaly or manually), the weight becomes an efficient motor to effect a quick return of the carriage to normal position. It will, therefore, be understood that we have, in this machine, preferably provided power-actuated means for effecting the advancing movement of the carriage toward the axis of the tire-core and also for effecting its receding movement therefrom. These movements of the carriage are produced, first, in order to position the fabric-manipulating devices carried by the carriage into operating relation with respect to the tire-core and, then to effect withdrawal of such devices away from the core; and all of these operations are preferably accomplished by power-actuated mechanisms that are designed to make the machine, in these respects at least, automatic in its action whereby both the core and the presser-supporting carriage are actuated in synchronism and whereby, also their relation with respect to each other may be changed for the purposes of permitting the different devices of the machine to perform their respective functions.

During the retraction of the carriage to its starting position, the presser-rolls 114 are caused to spread apart so as to be out of engaging position with respect to the tire-core, and this is accomplished by admitting a pressure-fluid to the cylinder 129, by means of the valve 146 and solenoid 156. The electric circuit which controls the solenoid is led through the pair of make-and-break devices 157—159 actuated by the rock shaft 81. The arrangement is such that when the shaft has been rocked to disengage the gear 61 from its rack, the circuit will be closed through the solenoid 156, and this will unseat the valve and permit the pressure-fluid through the valve 146 into the cylinder 129. The closing of the circuit is timed so that the presser-rolls 114 are automatically separated from the tire-core when the carriage has reached the limit of its advancing movement and is about to return to starting position.

The first ply of fabric having been laid and stretched upon the tire-core, and the machine having been repositioned to have its mechanisms again perform their respective functions, the operator initially positions another ply of fabric upon the core, this ply preferably having its threads extending angularly to those of the first ply—the fabric being cut on a bias—whereupon the machine is again operated to lay and stretch the second ply upon the core and in the manner already described. The operations, up to this point, of ply-laying may be called the "under-bead" operation of the machine.

When one, two or more plies have been laid and stretched upon the core, the machine is then ready for the "over-bead" operation, and this involves the placing of endless beads or bead-cores upon opposite sides of the fabric-covered core and, then, the laying and stretching of plies of fabric thereover. In the fabrication of an ordinary four-ply tire-carcass, two plies are first successively superposed upon the core, after which the beads are impressed upon these plies of fabric, and, then, two more plies of the tire-fabric are placed over the first two plies and embrace the beads. In the present machine, the beads are preferably placed quickly and accurately in position on the fabric-covered core by the mechanical means already described and include the bead-setting rings 182, and 183, and then these rings are automatically interlocked through the catch-members 215.

After the beads have been set in position, one, two or more plies of tire-fabric are superposed thereon, and, for this, the fabric-laying and pressing mechanisms, already described, are again brought into operation: Then, however, the presser-rolls 114 do not travel down to the edges of the fabric, but only to the toe of the beads. To this end, the presser-carrying carriage is not permitted to have as long a travel as for the under-bead operation: Before or while the carriage is making its advancing movement toward the tire-core, for the under-bead operation, the operator positions the stop member 90 into the path of engagement with the trip-arm 83: It will be seen that the trip-arms 89 and 90 are spaced apart so that the arm 90, when in engaging position, will abut against the lever 83 at a period earlier in the travel of the carriage than would the arm 89. Consequently, the carriage is permitted to have a shorter travel toward the axis of the tire-core when the arm 90 is to engage the lever 83 than when it is to be engaged by the arm 89. The operator releases the keeper from engagement with the adjusting-disk 92 and turns the shaft 87 until the trip-member 89 has been rotated out of its position in the path of the trip-arm 83 and the trip-member 90 has been rotated thereinto.

As already stated, the presser-rolls, for the over-bead operation, travel only to the toes of the beads. To complete the pressing of the fabric upon the beads and down to their edges, the bead-disks 168 are positioned into engagement with the fabric on the core by the foot-lever 178. Then, any overlapping fabric may be trimmed by the knives 220 which are positioned by the foot-lever 223. The carcass being then completed, the core is removed from its support on the machine.

What we claim is:

1. A tire-making machine including a tire-building core, means for rotating the core, automatic means for stopping the same after it has accomplished a predetermined rotation, fabric-pressing devices operatively associated with the core, and means for positioning the pressing-devices toward and then effecting their operation on the core while the latter is in continued rotation.

2. A tire-making machine including a tire-building core, means for rotating the core, automatic means for stopping it after it has accomplished a predetermined rotation including electrically-controlled mechanism therefor, fabric-pressing devices operatively associated with the core, and means for positioning the pressing devices toward and then effecting their operation on the core while the latter is in continued rotation.

3. A tire-making machine including a tire-building core, means for rotating the core, automatic means for stopping the same after it has accomplished a predetermined rotation including a brake and electrical-contact apparatus, fabric-pressing devices operatively associated with the core, and means for positioning the pressing-devices toward and then effecting their operation on the core while the latter is in continued rotation.

4. A tire-making machine including a tire-building core, means for rotating the core, automatic means for stopping the same after it has accomplished a predetermined rotation, means for preventing rebound of the core when stopped, fabric-pressing devices operatively associated with the core, and means for positioning the pressing-devices toward and then effecting their operation on the core while the latter is in continued rotation.

5. A tire-making machine including a tire-building core, means for rotating the core, automatic means for stopping the same after it has accomplished a predetermined rotation including a magnetic clutch and electrical mechanism for energizing and deenergizing the same, fabric-pressing devices operatively associated with the core, and means for positioning the pressing-devices toward and then effecting their operation on the core while the latter is in continued rotation.

6. A tire-making machine including a tire-building core, means for rotating the core, automatic means for stopping the same after it has accomplished a predetermined rotation including a magnetic clutch and electrical mechanism for energizing and deenergizing the same, means for returning one element of the clutch to starting position, fabric-pressing devices operatively associated with the core, and means for positioning the pressing-devices toward and then effecting their operation on the core while the latter is in continued rotation.

7. A tire-making machine including a tire-building core, means for rotating the core, automatic means for stopping the same after it has accomplished a predetermined rotation including a magnetic clutch and electrical mechanism for energizing and deenergizing the same, means for returning one element of the clutch to starting position, means for limiting the rotative movement of said element, fabric-pressing devices operatively associated with the core, and means for positioning the pressing-devices toward and then effecting their operation on the core while the latter is in continued rotation.

8. A tire-making machine including a rotatable tire-building core, driving mechanism therefor, means for cushioning the initial movement of the core when actuated by said mechanism, fabric-pressing devices operatively associated with the core, and means for positioning the pressing-devices toward and then effecting their operation on the core while the latter is in continued rotation.

9. A tire-making machine including a tire-building core, a plurality of speed mechanisms for driving the core, means for alternately clutching said speed mechanisms to the core, cushioning means for the clutching means, fabric-pressing devices operatively associated with the core, and means for positioning the pressing-devices toward and then effecting their operation on the core while the latter is in continued rotation.

10. A tire-making machine including a tire-building core, a plurality of speed mechanisms for driving the core, means for alternately clutching said speed mechanisms to the core, cushioning means for the clutching means, including adjustable friction members for permitting lost-motion between the elements of the speed mechanisms when they are actuated to rotate the core, fabric-pressing devices operatively associated with the core, and means for positioning the pressing-devices toward and then effecting their operation on the core while the latter is in continued rotation.

11. A tire-making machine comprising a rotatable tire-building core, a main driving element, variable speed mechanisms for connecting said main driving element to the core, a magnetic clutch-mechanism operatively associated with the variable speed mechanisms, fabric-pressing devices operatively associated with the core, and means for positioning the pressing-devices toward and then effecting their operation on the core while the latter is in continued rotation.

12. A tire-making machine comprising a rotatable tire-building core, a main driving element, variable speed mechanisms for connecting said main driving element to the core, a magnetic clutch mechanism operatively associated with the variable speed mechanisms, a brake mechanism actuatable to stop the core after a predetermined amount of rotation, fabric-pressing devices operatively associated with the core, and means for positioning the pressing-devices toward and then effecting their operation on the core while the latter is in continued rotation.

13. A tire-making machine comprising a rotatable tire-building core, a main driving element, variable speed mechanisms for connecting said main driving element to the core, a magnetic clutch mechanism operatively associated with the variable speed mechanism, a brake mechanism actuatable to stop the core after a predetermined amount of rotation and including a band, a drum encompassed thereby, a lever mechanism attached to the band, and a solenoid to actuate the lever, fabric-pressing devices operatively associated with the core, and means for positioning the pressing-devices toward and then effecting their operation on the core while the latter is in continued rotation.

14. A tire-making machine including a tire-building core having a two-phase rotation, means for effecting rotation of the same first for a single rotation, and, then, for a continued series of rotations, fabric-stretching mechanism juxtaposed to the core and rendered active by and during the single rotation of the core and its consequent action of drawing fabric thereonto, and means for mechanically laying the fabric onto the core during the continued rotation thereof.

15. A tire-building machine including a rotatable tire-core, having a two-phase revolution, a fabric-supplying instrumentality juxtaposed thereto, a fabric-stretching device operatively associated with said instrumentality, and means for controlling the rotation of the core for an approximate single revolution to draw a ply of fabric from said instrumentality and simultaneously effect an initial stretching thereof, and, then, for automatically arresting its rotation toward the completion of its initial revolution.

16. A tire-building machine including a tire core, having a two-phase revolution, a fabric-supplying structure juxtaposed thereto, a fabric-stretching device operatively associated with the fabric-supplying structure, and means for effecting a partial operation of the core for approximately a single revolution to draw fabric from the supplying structure and to render said stretching device active accurately to stretch the fabric to a predetermined degree and then automatically arresting rotation of the core toward the completion of its initial revolution.

17. A tire-building machine including a tire-core, a fabric-supplying structure juxtaposed thereto, a fabric-stretching device operatively associated with the fabric-supplying structure, and means for effecting a single initial rotation of the core to draw fabric from the supplying structure and simultaneously render said stretching device active to effect an accurate stretching of the fabric to a predetermined degree along its medial portion and then automatically arresting rotation of the core toward the completion of its initial revolution.

18. A tire-building machine including a tire-core, a fabric-supplying structure juxtaposed thereto, a fabric-stretching device operatively associated with the fabric-supplying structure, means for effecting a single initial rotation of the core to draw fabric from the supplying structure and to render said stretching device active to effect an accurate stretching of the fabric to a predetermined degree along its medial portion, and means for arresting rotation of the tire-core at a predetermined point whereby a uniform stretching of each ply of fabric drawn from the fabric-supplying structure is effected.

19. A tire-making machine including a tire-core, a tread-laying instrumentality, and fluid pressure operated means for automatically positioning said instrumentality toward and away from the core.

20. A tire-making machine including a tire-building core, a carriage movable relatively thereto, a fluid pressure operated tread-rolling device juxtaposed to the carriage, and power operated means for automatically positioning said device toward and away from the core.

21. A tire-making machine including a tire-building core, a presser-supporting carriage movable in relation thereto, a tire-rolling device, and means controlled by the position of the carriage for actuating said device into operative relation with respect to the core.

22. A tire-making machine comprising a tire-core, mechanism movable into and out of proximity to the core for pressing the fabric about the core, a tread-laying instrumentality actuatable into and out of proximity to the core, and automatic means including a fluid-pressure operated device for positioning said tread-laying instrumentality.

23. A tire-making machine comprising a tire-core, mechanism movable into and out of proximity to the core for pressing the fabric about the core, a tread-laying instrumentality actuatable into and out of proximity to the core, automatic means including a fluid-pressure operated device for positioning said tread-laying instrumentality, and means for operating the tread-laying instrumentality, in advance of the operation of the pressing mechanism.

24. A tire-making machine comprising a tire-core, fabric-pressing mechanism movable into and out of proximity to the core, a tread-laying instrumentality also operable into proximity to the core, and automatic means including a fluid-pressure operated device for positioning said tread-laying instrumentality in advance of the operation of said pressing mechanism.

25. A tire-making machine comprising a tire-core, fabric-pressing mechanism movable into and out of proximity to the core, a tread-laying instrumentality also operable into proximity to the core, automatic means including a fluid-pressure operated device for positioning said tread-laying instrumentality in advance of the operation of said pressing mechanism, and means for effecting withdrawal of the tread-laying instrumentality after a predetermined period of engagement thereof with the core.

26. A tire-making machine comprising a tire-core, fabric-pressing mechanism movable into and out of proximity to the core, a tread-laying instrumentality also operable into proximity to the core, automatic means including a fluid-pressure operated device for positioning said tread-laying instrumentality in advance of the operation of said pressing mechanism, and means for effecting withdrawal of the tread-laying instrumentality after a predetermined period of engagement thereof with the core, including a pressure-operated device.

27. A tire-making machine including a tire-building core, fabric-pressing mechanism positionable in relation to the core, automatic means for positioning said mechanism, a tread-laying instrumentality also positionable in relation to the core, and automatic means including a fluid-pressure operated device for effecting positioning of the tread-laying instrumentality.

28. A tire-making machine including a tire-building core, fabric-pressing mechanism positionable in relation to the core, automatic means for positioning said mechanism, a tread-laying instrumentality also positionable in relation to the core, and automatic means including a fluid pressure operated device for effecting positioning of the tread-laying instrumentality in advance of operation of the presser-positioning mechanism.

29. A tire-making machine comprising a tire-core, stitcher-devices operatively associated with the core, a tread-laying roller element juxtaposed to the core and independently of the stitcher devices, means for positioning said roller element in relation to the core including a cylinder, a piston movable therein, and a connection between the piston and said roller element.

30. A tire-making machine comprising a tire-core, stitcher devices operatively associated with the core, a tread-laying roller element juxtaposed to the core and independently of the stitcher devices, means for positioning said roller element in relation to the core including a cylinder, a piston movable therein, a connection between the piston and said roller element, and a pressure-fluid for operating the piston to advance or retract it and the roller element in respect to the core.

31. A tire-making machine comprising a tire-core, stitcher devices operatively associated with the core, a tread-laying roller element juxtaposed to the core and independently of the stitcher devices, means for positioning said roller element in relation to the core including a cylinder, a piston movable therein, a connection between the piston and said roller element, a pressure fluid for operating the piston to advance or retract it and the roller element in respect to the core. and means for relieving the pressure of said fluid within the cylinder at a predetermined time following the action of the roller element.

32. A tire-making machine including a tire-core having a two-phase revolution, means for effecting rotation of the same for approximately a single rotation, means for automatically effecting arrest of the core, independent means under control of the operator for effecting a continued rotation of the core, a tread-laying device positionable in relation to the core, automatic means for positioning said tread-laying device, fabric-manipulating devices, and automatic means for positioning said fabric-manipulating devices in relation to the core during the rotation thereof and subsequent to the action on the core of said tread-laying device.

33. A tire-making machine comprising a tire-core having a two-phase revolution, a fabric-supplying structure juxtaposed thereto, means for effecting a single rotation of the core to draw a ply of fabric from the supplying structure and simultaneously effect a predetermined stretching of the ply along its medial line, independent means under the control of the operator for effecting continued rotation of the core, a tread-laying instrumentality juxtaposed thereto, automatic means for positioning the tread-laying instrumentality in relation to the core, fabric-pressing members positionable in relation to the core, and automatic means for positioning the members in respect thereto.

34. A tire-making machine comprising a tire-core having a two-phase revolution, a fabric-supplying structure juxtaposed thereto, means for effecting a single rotation of the core to draw a ply of fabric from the supplying structure and simultaneously effect a predetermined stretching of the ply along its medial line, independent means under the control of the operator for effecting continued rotation of the core, a tread-laying instrumentality juxtaposed thereto, automatic means for positioning the tread-laying instrumentality in relation to the core, fabric-pressing members positionable in relation to the core, and automatic means for positioning the members in respect thereto after withdrawal of the tread-laying instrumentality away from the core.

35. A tire-building machine including a tire-core, means for rotating the same initially for a single revolution, means for supplying a ply of fabric to the core and simultaneously stretching the same thereon during the single revolution of the core, means for then effecting a continuous rotation of the core, a presser-supporting carriage having an advancing and receding movement in respect to the core, a tread-laying instrumentality positionable in relation to the core, and means set into operation during the advancing travel of the carriage for automatically positioning said tread-laying instrumentality into a core-engaging position.

36. A tire-building machine including a tire-core, means for initially effecting a single revolution thereof, means for applying fabric to and stretching the same on the core along its medial portion, means for then effecting continuous rotation of the core, a tread-laying instrumentality positionable in respect to the core, a carriage having an advancing and receding travel in relation to the core, automatic means for effecting a two-way travel of the carriage in relation to the core, and means operated by the travel of the carriage for effecting a core-engaging positioning of the tread-laying instrumentality.

37. A tire-building machine including a tire-core, means for initially effecting a single revolution thereof, means for applying fabric to and stretching the same on the core along its medial portion, means for then effecting continuous rotation of the core, a tread-laying instrumentality positionable in respect to the core, a carriage having an advancing and receding travel in relation to the core, automatic means for effecting a two-way travel of the carriage in relation to the core, and pneumatic means operated by the travel of the carriage for effecting a core-engaging positioning of the tread-laying instrumentality.

38. A tire-building machine including a tire-core, means for initially effecting a single revolution thereof, means for applying fabric to and stretching the same on the core along its medial portion, means for then effecting continuous rotation of the core, a tread-laying instrumentality positionable in respect to the core, a carriage having an advancing and receding travel in relation to the core, automatic means for effecting a two-way travel of the carriage in relation to the core, means operated by the travel of the carriage for effecting a core-engaging positioning of the tread-laying instrumentality, and adjustable means for automatically limiting the advancing movement of the carriage.

39. A tire-building machine including a tire-core, means for initially effecting a single revolution thereof, means for applying fabric to and stretching the same on the core along its medial portion, means for then effecting continuous rotation of the core, a tread-laying instrumentality positionable in respect to the core, a carriage having an advancing and receding travel in relation to the core, automatic means for effecting a two-way travel of the carriage in relation to the core, means operated by the travel of the carriage for effecting a core-engaging positioning of the tread-laying instrumentality, and manually operable means for arresting the advancing movement of the carriage.

40. A tire-building machine including a tire-core, means for initially effecting a single revolution thereof, means for applying fabric to and stretching the same on the core along its medial portion, means for then effecting continuous rotation of the core, a tread-laying instrumentality positionable in respect to the core, a carriage having an advancing and receding travel in relation to the core, automatic means for effecting a two-way travel of the carriage in relation to the core, means operated by the travel of the carriage for effecting a core-engaging positioning of the tread-laying instrumentality and automatic means for arresting the advancing travel of the carriage.

41. A tire-building machine including a tire-core, means for initially effecting a single revolution thereof, means for applying fabric to and stretching the same on the core along its medial portion, means for then effecting continuous rotation of the core, a tread-laying instrumentality positionable in respect to the core, a carriage having an advancing and receding travel in relation to the core, automatic means for effecting a two-way travel of the carriage in relation to the core, means operated by the travel of the carriage for effecting a core-engaging positioning of the tread-laying instrumentality, automatic means for arresting the advancing travel of the carriage, and means for effecting a receding movement of the carriage after its advancing movement has been arrested.

42. A tire-building machine including a carriage adapted to have an advancing movement, and a rack and pinion engageable for effecting the advancing movement of the carriage, said pinion being pivotally mounted for a swinging movement into and out of engagement with the rack.

43. A tire-building machine including a carriage adapted to have an advancing movement, a rack and pinion engageable for effecting the advancing movement of the carriage, a support for the pinion pivotally mounted for a swinging movement thereof in relation to the rack, and a holding member engaging with the pinion-support for maintaining engagement of the pinion and rack during the advancing movement of the carriage.

44. A tire-building machine including a carriage adapted to have an advancing movement, a rack and pinion engageable for effecting the advancing movement of the carriage, a support for the pinion pivotally mounted for a swinging movement thereof in relation to the rack, a holding member engaging with the pinion-support for maintaining engagement of the pinion and rack during the advancing movement of the carriage, a spring-controlled lever connected to said holding member, and trip mechanism carried by the carriage and engageable with said lever.

45. A tire-building machine including a carriage adapted to have an advancing movement, a rack and pinion engageable for effecting the advancing movement of the carriage, a support for the pinion pivotally mounted for a swinging movement thereof in relation to the rack, a holding member engaging with the pinion-support for maintaining engagement of the pinion and rack during the advancing movement of the carriage, a spring-controlled lever connected to said holding member, and trip mechanism carried by the carriage and engageable with said lever, comprising a supporting member and trips carried thereby in spaced-apart relation and positionable alternately into the path of said lever.

46. A tire-building machine including a carriage adapted to have an advancing movement, a rack and pinion engageable for effecting the advancing movement of the carriage, a support for the pinion pivotally mounted for a swinging movement thereof in relation to the rack, a holding member engaging with the pinion-support for maintaining engagement of the pinion and rack during the advancing movement of the carriage, a spring-controlled lever connected to said holding member, and trip mechanism carried by the carriage and engageable with said lever, comprising a supporting member and trips carried thereby in spaced-apart relation and positionable alternately into the path of said lever, and means for positioning said trips including a rotatable support and means for locking it in any of its plurality of adjusted positions.

47. A tire-building machine including a rotatable core, a carriage having an advancing and receding movement in relation to the core, means for effecting the advancing and receding movement of the carriage, fabric-pressing mechanism carried by and movable with the carriage comprising spaced-apart presser-devices, swinging arms on which the presser-devices are mounted, means having a tendency to move said presser-devices toward each other, and pneumatic means for effecting a separating movement of the presser-devices.

48. A tire-building machine including a rotatable core, a carriage having an advancing and receding movement in relation to the core, means for effecting the advancing and receding movement of the carriage, fabric-pressing mechanism carried by and movable with the carriage comprising spaced-apart presser-devices, swinging arms on which the presser-devices are mounted, means having a tendency to move said presser-devices toward each other, and pneumatic means for effecting a separating movement of the presser-devices and operating in synchronism with the movement of the carriage.

49. A tire-building machine including a rotatable tire-core, a carriage juxtaposed thereto and having an advancing and receding movement in relation thereto, means for effecting the advancing and receding movements of the carriage, presser-devices supported on and traveling with the carriage, pivotal supports for the presser-devices, resilient means for forcing the presser-devices toward each other for pressing engagement with the core, means for arresting the advancing movement of the carriage, and fluid-pressure operated means for effecting a separating movement of the presser-devices in predetermined relation to the arrest of the advancing movement of the carriage.

50. A tire-building machine including a rotatable tire-core, a carriage juxtaposed thereto and having an advancing and receding movement in relation thereto, means for effecting the advancing and receding movements of the carriage, presser-devices supported on and traveling with the carriage, pivotal supports for the presser-devices, resilient means for forcing the presser-devices toward each other for pressing engagement with the core, means for arresting the advancing movement of the carriage, and fluid-pressure operated means for effecting a separating movement of the presser-devices in predetermined relation to the arrest of the advancing movement of the carriage, comprising a cylinder carried by the carriage, pistons working in the cylinder, a connection between each piston and the supports for the presser-devices, and means for introducing a pressure-fluid into the cylinder.

51. A tire-building machine including a rotatable tire-core, a carriage juxtaposed thereto and having an advancing and receding movement in relation thereto, means for effecting the advancing and receding movements of the carriage, presser-devices supported on and traveling with the carriage, pivotal supports for the presser-devices, resilient means for forcing the presser-devices toward each other for pressing engagement with the core, means for arresting the advancing movement of the carriage, and fluid-pressure-operated means for effecting a separating movement of the presser-devices in predetermined relation to the arrest of the advancing movement of the carriage, comprising a cylinder carried by the carriage, pistons working in the cylinder, a connection between each piston and the supports for the presser-devices, means for introducing a pressure-fluid into the cylinder, and means for controlling the flow of pressure-fluid into the cylinder and automatically operated during the travel of the carriage.

52. A tire-building machine including a rotatable tire-core, a carriage juxtaposed thereto and having an advancing and receding movement in relation thereto, means for effecting the advancing and receding movements of the carriage, presser-devices supported on and traveling with the carriage, pivotal supports for the presser-devices, resilient means for forcing the presser-devices toward each other for pressing engagement with the core, means for arresting the advancing movement of the carriage, and fluid-pressure-operated means for effecting a separating movement of the presser-devices in predetermined relation to the arrest of the advancing movement of the carriage, comprising a cylinder carried by the carriage, pistons working in the cylinder, a connection between each piston and the supports for the presser-devices, means for introducing a pressure-fluid into the cylinder and automatically operated during the travel of the carriage and means for automatically returning the carriage to starting position after the separating movement of the presser-devices.

53. A tire-building machine comprising a tire-core, a carriage having an advancing and receding movement in relation thereto, presser-supporting members pivotally mounted on the carriage, presser-devices carried by the supporting members, means having a normal tendency to force the presser-devices toward each other and into engagement with the core, means engageable with said supporting members to maintain the presser-devices in predetermined spaced-apart relation in respect to the surface of the core, and fluid-pressure operated mechanism for effecting a separating movement of the presser-devices.

54. A tire building machine comprising a tire-core, a carriage having an advancing and receding movement in relation thereto, presser-supporting members pivotally mounted on the carriage, presser-devices carried by the supporting members, means having a normal tendency to force the presser-devices toward each other and into engagement with the core, means engageable with said supporting members to maintain the presser-devices in predetermined spaced-apart relation in respect to the surface of the core, means for automatically disengaging said maintaining means from said supporting members, and fluid-pressure-operated mechanism for effecting a separating movement of the presser-devices.

55. A tire-building machine including a tire-core, a carriage movable in relation thereto, swinging arms on the carriage, presser-devices carried by the swinging arms, resilient instrumentalities influencing the movement of the arms, and arm-controlling pins automatically positionable by the movement of the carriage and engageable with and active on the arms to restrain them against the force of the resilient instrumentalities.

56. A tire-building machine including a tire-core, a carriage movable in relation thereto, swinging arms on the carriage, presser-devices carried by the swinging arms, resilient instrumentalities influencing the movement of the arms, arm-controlling pins engageable with the arms, and means for automatically disengaging the pins from the arms.

57. A tire-building machine including a tire-core, a carriage movable in relation thereto, swinging arms on the carriage, presser-devices carried by the swinging arms, resilient instrumentalities influencing the movement of the arms, arm-controlling pins engageable with the arms, and means for automatically disengaging the pins from the arms comprising trip-mechanism operative during the travel of the carriage.

58. A tire-building machine including a tire-core, a carriage movable in relation thereto, arms mounted on the carriage and having a swinging movement in relation to the core, presser-devices carried by the arms and engageable with the core, means for limiting the swinging movement of the arms until the presser-devices have been brought into engagement with the core comprising pins movable into and out of the path of movement of the arms, and means for positioning the pins in relation to the arms.

59. A tire-building machine including a tire-core, a carriage movable in relation thereto, arms mounted on the carriage and having a swinging movement in relation to the core, presser-devices carried by the arms and engageable with the core, means for limiting the swinging movement of the arms until the presser-devices have been brought into engagement with the core comprising pins movable into and out of the path of movement of the arms, and means operative during the movement of the carriage for positioning said pins in relation to the arms.

60. A tire-building machine including a tire-core, a carriage movable in relation thereto, arms mounted on the carriage and having a swinging movement in relation to the core, presser-devices carried by the arms and engageable with the core, means for limiting the swinging movement of the arms until the presser-devices have been brought into engagement with the core comprising pins movable into and out of the path of movement of the arms, means operative during the movement of the carriage for positioning said pins in relation to the arms, and resilient means active on said arms to maintain them in engagement with the pins.

61. A tire-building machine including a tire-core, a carriage movable in relation thereto, presser-supporting members mounted on the carriage and having a swinging movement in relation to the core, member-engaging elements mounted in the carriage, means for projecting said elements into engagement with the members, resilient means carried by the carriage and maintaining the members in engagement with the elements, and automatic means for disengaging the elements from the members.

62. A tire-building machine including a tire-core, a carriage movable in relation thereto, presser-supporting members mounted on the carriage and having a swinging movement in relation to the core, member-engaging elements mounted in the carriage, means for projecting said elements into engagement with the members, resilient means carried by the carriage and maintaining the members in engagement with the elements, and automatic means for disengaging the elements from the members during the travel of the carriage, comprising trip-mechanism and a connection between it and the elements.

63. A tire-building machine comprising a tire-core, a carriage-support juxtaposed thereto, a carriage movable on the support in relation to the core, arms pivoted on the carriage, presser-devices on the arms, arm-engaging pins in the carriage, resilient means for holding the arms in engagement with the pins, and automatic means for disengaging the pins from the arms including co-acting trip-mechanism carried by the support and carriage, and a connection between the trip-mechanism and the pins.

64. A tire-building machine including a tire-core, a carriage having an advancing and receding movement in relation thereto, swinging members on the carriage, presser-devices carried by the swinging members, means having a normal tendency to force the presser-devices toward each other, means for automatically effecting a separating movement of the members in respect to the core at a predetermined point in the travel of the carriage, member-engaging elements positionable into and out of the path of movement of the members, and means for withdrawing said elements from engaging position in predetermined relation to the operation of the member-separating means.

65. A tire-building machine including a tire-core, a carriage having an advancing and receding movement in relation thereto, swinging members on the carriage, presser-devices carried by the swinging members, means having a normal tendency to force the presser-devices toward each other, means for automatically effecting a separating movement of the members in respect to the core at a predetermined point in the travel of the carriage, member-engaging elements positionable into and out of the path of movement of the members, means for withdrawing said elements from engaging position in predetermined relation to the operation of the member-engaging means, and means for maintaining said elements in the path of the said members during the initial travel of the carriage.

66. A tire-building machine including a tire-core, a carriage having an advancing and receding movement in relation thereto, swinging members on the carriage, presser-devices carried by the swinging members, means having a normal tendency to force the presser-devices toward each other, means for automatically effecting a separating movement of the members in respect to the core at a predetermined point in the travel of the carriage, member-engaging elements positionable into and out of the path of movement of the members, means for withdrawing said elements from engaging position in predetermined relation to the operation of the member-engaging means, and means for maintaining said elements in the path of said members during the initial travel of the carriage, said means being normally inoperative while the carriage is in starting position.

67. A tire-building machine including a tire-core, a carriage having an advancing and receding movement in relation thereto, swinging members on the carriage, presser-devices carried by the swinging members, member-swinging means having a normal tendency to move the presser-devices toward each other, member-engaging elements positionable into and out of the path of movement of the swinging members, means for withdrawing said elements from the path of movement of the swinging members, and means for maintaining said elements in operative engagement with the swinging members while the carriage is in its starting position comprising trip-mechanism actuatable during the advancing movement of the carriage.

68. A tire-building machine including a tire-core, a carriage having an advancing and receding movement in relation thereto, swinging members on the carriage, presser-devices carried by the swinging members, member-swinging means having a normal tendency to move the presser-devices toward each other, member-engaging elements positionable into and out of the path of movement of the swinging members, means for withdrawing said elements from the path of movement of the swinging members, means for maintaining said elements in operative engagement with the swinging members while the carriage is in its starting position comprising trip-mechanism actuatable during the advancing movement of the carriage, and resilient means active on said trip mechanism but normally of less power than the member-swinging means.

69. A tire-building machine including a tire-core, a carriage-support juxtaposed thereto, a carriage having an advancing and receding movement on the support in relation to the core, fabric-pressing devices carried by the carriage and positionable thereby in relation to the core, means for effecting the advancing movement of the carriage, a tread-laying device on the carriage-support, means actuated by the advancing movement of the carriage to position the tread-laying device into engagement with the core, and means for actuating the presser-devices toward and away from the core.

70. A tire-building machine including a tire-core, a carriage-support juxtaposed thereto, a carriage having an advancing and receding movement on the support in relation to the core, fabric-pressing devices carried by the carriage and positionable thereby in relation to the core, means for effecting the advancing movement of the carriage, a thread-laying device on the carriage-support, means actuated by the advancing movement of the carriage to position the tread-laying device into engagement with the core, means for actuating the presser-devices toward and away from the core, and means for effecting receding movement of the carriage.

71. A tire-building machine including a tire-core, a carriage-support juxtaposed thereto, a carriage having an advancing and receding movement on the support in relation to the core, fabric-pressing devices carried by the carriage and positionable thereby in relation to the core, means for effecting the advancing movement of the carriage, a tread-laying device on the carriage-support, means actuated by the advancing movement of the carriage to position the tread-laying device into engagement with the core, means for actuating the presser-devices toward and away from the core, means for effecting receding movement of the carriage, and means for swinging the presser-devices out of engagement with the core in predetermined relation to the receding movement of the carriage.

72. A tire-building machine including a tire-core, a carriage having an advancing and receding movement in relation thereto, presser-devices mounted on and traveling with the carriage, a tread-laying device positionable into engagement with the core, means for effecting movement of the presser-devices toward each other and into engagement with the core, and pressure-fluid mechanism for positioning said tread-laying device and for disengaging the presser-devices from the core.

73. A tire-building machine including a tire-core, a carriage having an advancing and receding movement in relation thereto, presser-devices mounted on and traveling with the carriage, a tread-laying device positionable into engagement with the core, means for effecting movement of the presser-devices toward each other and into engagement with the core, pressure-fluid mechanism for positioning said tread-laying device and for disengaging the presser-devices from the core, and means operating to actuate said pressure-fluid mechanism in predetermined relation to the advancing movement of the carriage.

74. A tire-building machine including a tire-core, a carriage having an advancing and receding movement in relation thereto, presser-supporting members on the carriage movable in relation to the core, fabric-pressers on the members, means normally active on said members to move the pressers toward each other, a tread-laying device positionable into engagement with the core, and pressure-operated mechanism operative during the initial advancing movement of the carriage to position the tread-laying device in respect to the core and actuating at a later stage in the advancing movement of the carriage to effect a separating movement of said presser-supporting members.

75. A tire-building machine including a tire-core, a carriage having an advancing and receding movement in relation thereto, presser-supporting members on the carriage movable in relation to the core, fabric-pressers on the members, means normally active on said members to move the pressers toward each other, a tread-laying device positionable into engagement with the core, power-operated means for effecting the advancing movement of the carriage, means for automatically arresting such advancing movement, power-operated means for effecting the receding movement of the carriage to its starting position, and pressure-operated mechanism actuatable during the initial advancing movement of the carriage to position said tread-laying device in relation to the core and actuatable at a later stage of the advancing movement of the carriage and in predetermined relation to the automatic arrest thereof for effecting a swinging movement of said presser-supports away from the core.

76. A tire-building machine including a tire-core, a presser-supporting carriage movable in relation thereto, power-operated means for effecting an advancing under-bead operating travel of the carriage toward the core, presser-devices carried by and positionable by the carriage in respect to the core, means for automatically arresting the carriage at a predetermined position in relation to the core, power operated means for setting beads on the fabric-covered core, and means for changing the advancing travel of the carriage for its over-bead operation whereby the presser-devices will traverse the fabric-covered core to the beads on the core.

77. A tire-building machine including a tire-core, a presser-supporting carriage movable in relation thereto, power-operated means for effecting an advancing under-bead operating travel of the carriage toward the core, presser-devices carried by and positionable by the carriage in respect to the core, means for automatically arresting the carriage at a predetermined position in relation to the core, power operated means for setting beads on the fabric-covered core, means for changing the advancing travel of the carriage for its over-bead operation whereby the presser-devices will traverse the fabric-covered core to the beads on the core, and independent fabric-pressing members positionable into engagement with the core to press the fabric over the beads thereon.

78. A tire-building machine including a tire-core, a carriage movable in relation thereto, presser-devices mounted on and positionable by the carriage in respect to the core, bead-setting mechanism juxtaposed to the core, and power-operated mechanism for actuating said presser-devices and said bead-setting mechanism.

79. A tire-building machine including a tire-core, fabric pressing devices positionable in relation to the core, bead-setting mechanism juxtaposed to the core, and power-operated mechanism for actuating said pressing-devices and for operating said bead-setting mechanism.

80. A tire-building machine including a tire-core, a fabric-supplying structure juxtaposed thereto and adapted to deliver separate plies of fabric to the core for the under and over-bead operations thereof, fabric-presser devices positionable in relation to the core, bead-setting mechanism juxtaposed to the core, and power-operated means for actuating said presser-devices and for operating said bead-setting mechanism.

81. A tire-building machine including a tire-core, fabric-presser devices positionable in relation thereto, bead-setting mechanism juxtaposed to the core for positioning beads on opposite sides thereof, and power-operated mechanism for actuating said fabric-presser devices in respect to the core and for operating said bead-setting mechanism.

82. A tire-building machine including a tire-core, fabric presser devices positionable in relation thereto, bead-setting mechanism juxtaposed to the core for positioning beads on opposite sides thereof, and power-operated mechanism for actuating said fabric-presser devices in respect to the core and for operating said bead-setting mechanism; said bead-setting mechanism including a bead-support concentric with the core, a second bead-support having a swinging movement in relation to the core, and power-operated mechanism for actuating said fabric-pressing devices and for moving said bead-supports in relation to each other.

83. A tire-building machine including a tire-core, a bead-setting ring concentric with the core, a second bead-support having a swinging movement in relation to the core, means for connecting the two supports, presser-devices positionable in relation to the core, and pressure-operated mechanism for actuating the presser-devices and for moving said bead-supports toward each other when connected together.

84. A tire-building machine including a tire-core, fabric-pressing devices positionable in respect to the core, means for effecting an advancing movement of said fabric-pressing devices toward the core, means for automatically arresting the traveling movement of said presser-devices at a predetermined point in respect to the core, bead-setting mechanism juxtaposed to the core and comprising a bead-support concentric with the core, a second bead-support having movement in respect to the core, means for connecting the bead-supports, means for supplying fabric to and positioning the same on the core after the bead-supports have been connected together, and power-operated means for actuating said bead-setting mechanism and for actuating said presser-devices both before and after the operation of said bead-setting mechanism.

85. A tire-building machine including a tire-core, fabric-pressing devices positionable in respect to the core, means for effecting an advancing movement of said fabric-pressing devices toward the core, means for automatically arresting the traveling movement of said presser-devices at a predetermined point in respect to the core, bead-setting mechanism juxtaposed to the core and comprising a bead-support concentric with the core, a second bead-support having movement in respect to the core, means for connecting the bead-supports, means for supplying fabric to and positioning the same on the core after the bead-supports have been connected together, and power-operated means for actuating said bead-setting mechanism and for actuating said presser-devices both before and after the operation of said bead-setting mechanism including pressure-fluid actuating means and mechanism for controlling the flow of the pressure-fluid.

86. A tire-building machine including a tire-core, a carriage-support juxtaposed thereto, a carriage movable on the support in relation to the core, fabric-pressing devices on the carriage and positionable thereby in relation to the core, bead-setting mechanism juxtaposed to the core, trimming mechanism on the carriage-support and positionable in relation to the core, and power-operated mechanism for actuating said pressing devices in respect to the core and for operating said bead-setting mechanism.

87. A tire-building machine including a rotatable tire-core, a carriage-support juxtaposed thereto, trimming members sustained by the support and positionable against opposite sides of the core, means for effecting such positioning, a carriage movable on the support in relation to the core, presser-devices positionable by the carriage in respect to the core, a fabric-laying device juxtaposed to the core, bead-setting mechanism comprising a bead-support concentric with the core, a second bead-support movable into engagement with the core, power-operated means for actuating said presser-devices in respect to the core and for positioning the tread laying device into engagement with the core and for actuating said bead-setting mechanism, and a fabric-supply juxtaposed to the core for supplying plies of fabric to the core.

88. A tire-building machine including a tire-core, means for rotating the same, fabric-presser devices positionable in relation to the core, pressure-operated mechanism for actuating said presser-devices, and electrical means for controlling the rotation of the core and the operation of said pressure-mechanism.

89. A tire-building machine including a tire-core, means for rotating the same, fabric-presser devices positionable in relation to the core, pressure-operated mechanism for actuating said presser-devices, and electrical means for controlling the pressure-operated mechanism.

90. A tire-building machine including a rotatable tire-core, means for effecting a single rotation thereof, means for automatically arresting rotation of the core after making a single revolution, a low-speed drive for the core, a high-speed drive therefor, electrical selecting mechanism for connecting the single rotation means, the low-speed drive, or the high-speed drive to the core, fabric-presser devices positionable in respect to the core, and a drive common to the core and presser-devices.

91. A tire-building machine including a tire-core, a main drive, a rotatable core, means for effecting an initial single rotation of the core, means for automatically arresting rotation of the core after making a single revolution, a low-speed drive for the core, a high-speed drive therefor, electrical selecting mechanism for connecting the main drive and the single rotation means, the low-speed drive or the high-speed drive, with the core, fabric-manipulating mechanism juxtaposed to the core, means for actuating said mechanism in respect to the core, and operating connections between said actuating means and the main drive, whereby the core and the presser-devices are operated in synchronism.

92. A tire-building machine including a tire-core, a main drive, means for effecting a single rotation of the core, means for automatically arresting rotation of the core after making a single revolution, a low-speed drive for the core, a high-speed drive therefor, a control-station juxtaposed to the machine, electrical apparatus interposed between the control-station and the main and core-drives, whereby a selection may be effected to connect the core with the single rotation means, with the low-speed drive or with the high-speed drive, fabric-pressing devices positionable in respect to the core, means for effecting such positioning, and means for connecting the main drive and such positioning means.

93. A tire-building machine including a tire-core, a main drive, means for effecting a single rotation of the core, a low-speed drive for the core, a high-speed drive therefor, a control-station juxtaposed to the machine, electrical apparatus interposed between the control-station and the main and core-drives, whereby a selection may be effected to connect the core with the single rotation means, with the low-speed drive or with the high-speed drive, fabric-pressing devices positionable in respect to the core, means for effecting such positioning, and means for connecting the main drive and such positioning means; in combination with an elevating stock-rack comprising a plurality of rolls, mechanism for positioning one or another of said rolls in respect to the core, and electrical connections between said positioning mechanism and said control-station.

94. A tire-building machine including a bead-ring applying structure, a support therefor, and motor-operated means for actuating the structure on its support to any of a plurality of positions.

95. A tire-building machine including a tire-forming core, a bead-ring applying structure associated therewith, and motor operated mechanism for actuating said structure in relation to the core.

96. A tire-building machine including a bead-ring applying structure, a support therefor, and means for reciprocating said structure on the support from a normally inactive position to an operating position.

97. A tire-building machine including a tire-forming core, a bead-ring setting structure operatively associated therewith, and pressure-fluid operated mechanism associated with the bead-setting structure for actuating the same in relation to the core.

98. A tire-building machine including a tire-forming core, a bead-ring setting structure normally in a position relatively remote from the core, and pressure-mechanism associated therewith and operative at the will of the operator to reciprocate the setting-structure in relation to a side of the core.

99. A tire-building machine including a tire-forming ring-core, a bead-ring setting structure operatively associated with but normally disengaged from the core, and pneumatically-operated mechanism for moving said structure toward the core to apply a bead to a side thereof.

100. A tire-building machine including a tire-forming ring-core, a bead-setting structure operatively associated with but normally disengaged from the core and comprising an annular bead-supporting member, and pneumatically-operated mechanism for moving said member toward the core to apply a bead to a side thereof, and operative also for returning the member to inactive position.

101. A tire-building machine including a tire-forming core, a bead-setting structure operatively associated with the core and including associable bead-applying devices, and pneumatically-operated means for interlocking said applying devices.

102. A tire-building machine including a tire-forming core, a bead-setting structure operatively associated therewith and comprising associable bead-applying devices positionable toward and away from opposite sides of the core, power-operated means for actuating one of the devices toward the core, and power-operated means for effecting an interlocking of the oppositely-disposed devices.

103. A tire-building machine including a tire-forming core, a bead-setting structure operatively associated therewith and comprising an associable pair of bead-applying devices positionable toward and away from opposite sides of the core, pressure fluid operated mechanism for actuating one of the devices toward the core and into cooperating position with the other device, and power-operated means for effecting an interlocking of the two devices and a pressing of the same against the core.

104. A tire-building machine including a tire-forming core, a bead-setting structure operatively associated therewith and comprising associable bead-applying devices positionable toward and away from opposite sides of the core, pressure-fluid operated mechanism for actuating one of the devices toward the core and into cooperating position with the other device, and power-operated means for effecting an interlocking of the two devices and a pressing of the same against the core, each of said means being rendered active at the will of the operator.

105. A tire-building machine including a tire-forming core, a bead-setting structure operatively associated therewith and comprising associable bead-applying devices positionable toward and away from opposite sides of the core, pressure-fluid operated mechanism for actuating one of the devices toward the core and into cooperating position with the other device, power-operated means for effecting an interlocking of the two devices and a pressing of the same against the core, each of said means being rendered active at the will of the operator, and mechanism under the control of the operator for setting said means into action.

106. In a machine for making tire carcasses, the combination of a core, bead engaging rings on opposite sides of the core, and means for simultaneously pressing said rings toward the core.

107. A tire-making machine including a tire-building core, fabric-pressing mechanism positionable in respect to the core, fluid-pressure operated mechanism active on said fabric-pressing mechanism for positioning it in respect to the core, a fluid-pressure system connected to said fluid-pressure operated mechanism, a bead-setting structure juxtaposed to the core, a connection between said structure and the fluid-pressure system, and manually-operated means for controlling the flow of pressure fluid from said system to said bead-setting structure for actuating it alternately in opposite directions.

108. A tire-making machine including a tire-building core, fabric-pressing mechanism positionable in respect to the core, fluid-pressure operated mechanism active on said fabric-pressing mechanism for positioning it in respect to the core, a fluid-pressure system connected to said fluid-pressure operated mechanism, a bead-setting structure juxtaposed to the core, a connection between said structure and the fluid-pressure system, and manually-operated means for controlling the flow of pressure-fluid from said system to said bead-setting structure for actuating it alternately in opposite directions, including a two-way valve, and a hand-actuated valve-operating lever for controlling the flow of pressure-fluid through the valve first to actuate the bead-setting structure toward the core and then to retract it therefrom.

109. A tire-making machine including a tire-building core, fabric-pressing mechanism positionable in respect to the core, fluid-pressure operated mechanism active on said fabric-pressing mechanism for positioning it in respect to the core, a fluid-pressure system connected to said fluid-pressure operated mechanism, a bead-setting structure juxtaposed to the core, a connection between said structure and the fluid-pressure system, and manually-operated means for controlling the flow of pressure-fluid from said system to said bead-setting structure for actuating it alternately in opposite directions, including a two-way valve, and a hand-actuated valve-operating lever for controlling the flow of pressure-fluid through the valve first to actuate the bead-setting structure toward the core and then to retract it therefrom, said bead-setting structure including bead-holding rings, means for interlocking the rings, and a connection there-between and the pressure-fluid system for actuating said interlocking means.

110. A tire-making machine including a tire-building core, a support juxtaposed thereto, a carriage on the support and movable in respect to the core, fabric-pressing mechanism on the carriage and positionable thereby in respect to the core, and tread-laying mechanism also mounted on the support and positionable in respect to the core independently of the operation of the carriage.

111. A tire-building machine including fabric-pressing mechanism, fluid-pressure-operated mechanism for actuating said mechanism, a fluid-pressure system associated therewith, a bead-setting structure, and means connected to said system for operating the bead-setting structure.

112. A tire-making machine including a tire-building core, fabric-stitching mechanism operable on the core, a fluid-pressure system juxtaposed to the stitching-mechanism, a fluid operated bead-setting structure operatively associated with the core, and means for controlling the flow of pressure-fluid from said system to the bead-setting structure for actuating it in relation to the core.

113. A tire-making machine including a tire-building core, fabric-stitching mechanism operable on the core, a fluid-pressure system juxtaposed to the stitching-mechanism, a fluid operated bead-setting structure operatively associated with the core, and means including electrically-operated mechanism for controlling the flow of pressure-fluid from said system to the bead-setting structure for actuating it in relation to the core.

114. A machine for making tires including a tire-forming core, fabric-stitching devices movable in relation thereto, a fluid operated bead-setting device, a fluid-pressure system connected to the stitching devices and to the bead-setting device, and manually-operated means for controlling the flow of pressure-fluid to actuate the bead-setting device alternately in opposite directions in respect to the core.

115. A machine for making tires including a tire-forming core, fabric-stitching devices movable in relation thereto, a fluid operated bead-setting device including bead-holding rings operable at opposite sides of the core, means for effecting an interlocking of the rings, a fluid-pressure system connected to the stitching devices and to the bead-setting device, pressure-operated means connected to the fluid-pressure system for actuating said interlocking means, and manually-operated means for controlling the flow of pressure-fluid to actuate the bead-setting device alternately in opposite directions in respect to the core.

116. A tire-making machine including a tire-forming core, a carriage movable in relation thereto, swinging members on the carriage, means for actuating the members, fabric-stitching devices movable on the members, holding instrumentalities on the carriage for engaging the members, and means for automatically moving the holding means into and out of engagement with the members.

117. A tire-making machine including a tire-forming core, a carriage movable in relation thereto, swinging members on the carriage, means for actuating the members, fabric stitching devices movable on the members, holding instrumentalities on the carriage for engaging the members, means for automatically moving the holding means into and out of engagement with the members comprising an actuating-lever, means for moving the lever in one direction, and independent means controlled by the movement of the carriage for moving the lever in a different direction.

118. A machine for making tires including a tire-forming core, a carriage movable in relation thereto, fabric-pressing members carried thereby, and tread-laying mechanism also positionable in relation to the core but independently of the operation of the carriage.

119. A tire-building machine including a tire-forming core, power-operated mechanism for actuating the core, a stitcher-carriage, power-operated means for moving the carriage in relation to the core, fabric-stitching devices on the carriage, power-operated means for actuating the stitching devices, a bead-setting structure associated with the core, and power-operated means for actuating the setting-structure.

120. A tire-building machine including a tire-forming core, power-operated mechanism for actuating the core, a stitcher-carriage, power-operated means for moving the carriage in relation to the core, fabric-stitching devices on the carriage, power-operated means for actuating the stitching devices, a bead-setting structure associated with the core, power-operated means for actuating the setting-structure, a stock-supplying structure also associated with the core, and power-operated means for actuating the supplying structure.

121. A tire-making machine including a tire-building core, a support juxtaposed thereto, fabric-manipulating mechanism on the support and positionable in relation to the core, fabric-trimming mechanism juxtaposed to said support and normally disengaged from the core, and means for positioning said trimming mechanism into and out of operating position with respect to the core, comprising a plurality of swinging arms, fabric-cutters carried thereby, levers connected to said arms, and a foot-operated device connected to said levers whereby its movement in one direction swings said arms toward and positions the cutters into trimming relation with respect to the core.

122. A tire-building machine including a rotatable core, primary stitcher instrumentalities associated therewith, a stitcher device operable independently of the primary stitcher-instrumentalities, a support swingingly associated with the core and on which the said stitcher device is mounted, a second support swingingly associated with the core, and a trimming device mounted thereon and movable therewith in respect to the core.

123. A tire-building machine including a rotatable-core, a primary stitcher-instrumentality associated therewith, a stitcher-device disposed in a plane below the axis of the core, a trimming-device similarly disposed below the axis of the core, swinging supports for the stitcher and trimming devices, and means for actuating the supports in respect to the core.

124. A tire-building machine including a rotatable core, primary stitcher-instrumentalities associated therewith, a support swingingly associated with the core, an arm swingingly associated with the support, a stitcher device on the arm operable successively to the action of the primary stitcher-instrumentalities, a trimming device associated with the core and operable successively to the action of the stitcher device, a swinging support on which the trimming device is mounted and by which it is actuated in respect to the core, and means for actuating said supports in respect to the core.

125. A tire-building machine including a support, a stitcher device associated therewith and including supporting-arms, levers pivoted thereto, axles on which the levers are mounted, gearing associated with the levers, a foot-lever for operating the gearing, and trimming mechanism associated with the stitcher-device.

126. A tire-building machine including a rotatable core, a stitcher device associated therewith and including bead-disks movable radially with respect to the axis of the core, disk-supporting arms associated therewith, levers to which the arms are pivoted, gearing associated with the levers for operating the same, a foot-lever for operating the gearing, means for restoring the parts to normal position, and trimming mechanism associated with the stitcher-device for trimming surplus fabric after action thereon by the stitcher-device.

127. A tire-building machine including a rotatable core, primary stitcher-instrumentalities associated therewith, an auxiliary stitcher device operable independently of the primary stitcher-instrumentalities but successively thereto to smooth fabric-plies down on beads on the core and including a pedestal, supporting-arms associated therewith, bead-disks on the arms and movable thereby with respect to the axis of the core, levers on which the arms are pivoted, axles on which the levers are mounted, bearings in the pedestal in which the axles are journaled, intermeshing gears attached to the axles, a control-gear meshing with said gears, a shaft on which the control-gear is mounted, a foot-lever associated with the shaft for operating the same, a spring associated with the lever for returning it to normal position and thereby effecting a separation of the disks and a movement of the same away from the core, and trimming-mechanism associated therewith.

128. A tire-building machine including a rotatable core, stitcher-mechanism associated therewith, and trimming-mechanism associated with the stitcher-mechanism and operable in succession to the action thereof to trim surplus fabric on the core and including a pair of actuating-arms movable toward and away from each other and in relation to the core, and a foot-lever for actuating the arms.

129. A tire-building machine including a rotatable core, stitcher-mechanism associated therewith, and trimming-mechanism associated with the stitcher mechanism and operable in succession to the action thereof and including a support, swinging arms carried thereby, cutter-devices carried by the arms and adjustable thereon, means for swinging the arms simultaneously to present the cutter-devices in contact with opposite sides of the core, and a foot-operated device associated with the levers for actuating the same.

130. A tire-building machine including a tire-forming core, a bead-setting structure operatively associated therewith, pressure-fluid operated mechanism associated with the bead-setting structure for actuating the same in relation to the core, fabric-pressing mechanism operatively associated with the core, pressure-fluid operated mechanism for actuating said pressing-mechanism, and pressure-fluid supplying means common to both of said fluid-operated means and under the control of the operator.

131. A tire-making machine including a tire-building core, fabric-pressing mechanism positionable in respect to the core, fluid-pressure operated mechanism active on said fabric-pressing mechanism for positioning it in respect to the core, a fluid-pressure system connected to said fluid-pressure operated mechanism, a bead-setting structure operatively associated with the core, and a connection between said structure and the fluid-pressure system.

132. A tire-making machine including a tire-building core; fabric-pressing mechanism positionable in respect to the core; fluid-pressure operated mechanism active on said fabric-pressing mechanism for positioning it in respect to the core; a fluid-pressure system connected to said fluid-pressure operated mechanism; a bead-setting structure juxtaposed to the core; a connection between said structure and the fluid-pressure system; and means for controlling the flow of pressure-fluid from said system to said bead-setting structure for actuating it alternately in opposite directions, including a valve, and a valve-operating lever for controlling the flow of pressure-fluid through the valve, first to actuate the bead-setting structure toward the core and, then, to retract it therefrom.

133. A tire-making machine including a tire-building core; fabric-pressing mechanism positionable in respect to the core; fluid-pressure operated mechanism active on said fabric-pressing mechanism for positioning it in respect to the core; a fluid-pressure system connected to said fluid-pressure operated mechanism; a bead-setting structure juxtaposed to the core; a connection between said structure and the fluid-pressure system; and means for controlling the flow of pressure-fluid from said system to said bead-setting structure for actuating it alternately in opposite directions, including a valve, and a valve-operating lever for controlling the flow of pressure-fluid through the valve, first to actuate the bead-setting structure toward the core and, then, to retract it therefrom, said bead-setting structure including bead-holding rings, and means for interlocking the rings.

134. A tire-building machine including a rotatable core, a pair of swinging members associated with the core at opposite sides thereof, means common to the pair of members for moving them toward and away from each other and thus toward and away from the core, a stitcher device on the support, a trimming device associated therewith, and operable independently thereof and successively to the action of the stitcher device and means for maintaining the trimming device inactive while the stitcher device is being positioned in respect to the core.

135. A tire-building machine including a rotatable core, a pair of swinging members associated with the core at opposite sides thereof, means common to the pair of members for moving them toward and away from each other and thus toward and away from the core, a stitcher device on the support, a trimming device associated therewith and operable independently thereof and successively to the action of the stitcher device, (means for maintaining the trimming device inactive while the stitcher device is being positioned in respect to the core, and means for maintaining the stitcher device inactive while the trimming device is being positioned in respect to the core).

136. A tire-making machine including a tire-building core, means for rotating the core including a main drive, a plurality of variable speed-drives connected to the core and connectible with the main drive, magnetic clutches for connecting the variable speed-drives with the main drive, and automatic means for stopping the core after it has completed a single rotation including a brake, an electrical contact apparatus, and connections between said apparatus and the magnetic clutches.

137. A tire-making machine including a tire-building core, fabric-stitching mechanism operable on the core, a fluid-pressure system juxtaposed to the stitching-mechanism, a fluid operated bead-setting structure operatively associated with the core, mechanism for interlocking components of the bead-setting structure together, and means for controlling the flow of pressure-fluid from said system to the bead-setting structure for actuating it in relation to the core.

138. A machine for making tires including a tire-forming core, fabric-stitching devices, fluid-pressure operated means for moving the devices toward and away from the core, a fluid-pressure system therefor, a bead-setting device, fluid-pressure operated means for controlling the device and associated with the pressure system, and manually-operated means for controlling the pressure-operated means.

139. A machine for making tires including a tire-forming core, fabric-stitching devices, fluid-pressure operated means for moving the devices toward and away from the core, a fluid-pressure system therefor, a bead-setting device, fluid-pressure operated means for controlling the device and associated with the pressure system, and manually operated means for controlling the pressure-operated means and movable in one direction for advancing the setting-device toward the core and in a different direction for moving it away from the core.

140. A machine for making tires including a tire-forming core, fabric-stitching devices movable in relation thereto, a fluid operated bead-setting device including bead-holding rings operable at opposite sides of the core, a fluid-pressure system connected to the stitching devices and to the bead-setting device, and manually-operated means for controlling the flow of pressure-fluid to actuate the bead-setting device alternately in opposite directions in respect to the core.

141. A machine for making tires including a tire-forming core, fabric-stitching devices movable in relation thereto, a fluid operated bead-setting device including bead-holding rings operable at opposite sides of the core, means for effecting an interlocking of the rings, a fluid-pressure system connected to the stitching devices and to the bead-setting device, and manually-operated means for controlling the flow of pressure-fluid to actuate the bead-setting device alternately in opposite directions in respect to the core.

142. In a machine for making tire carcasses, the combination of a core, bead engaging rings on opposite sides of the core, and means for simultaneously actuating said rings with respect to the core.

143. In a machine for making tire carcasses, a pair of companion bead-engaging rings, and means for actuating said rings in respect to a tire carcass located between the rings.

144. In a machine for making tire carcasses, the combination of a pair of bead-positioning members, and means for effecting an interlocking of the members.

145. In a machine for making tire carcasses, the combination of a pair of bead-positioning members, means for effecting an interlocking of the members, and means for positioning one of said members in respect to the other, preparatory to effecting the interlocking relation.

In witness whereof, we have hereunto signed our names.

WILLIAM B. HARSEL.

THE GOODYEAR TIRE & RUBBER COMPANY,

By WILLIAM D. SHILTS,

*Asst. Secretary, for Edward Nall, Deceased*